(12) United States Patent
Mizuno et al.

(10) Patent No.: US 9,448,074 B2
(45) Date of Patent: Sep. 20, 2016

(54) CURVE MODELING DEVICE, CURVE MODELING METHOD, AND VEHICULAR NAVIGATION DEVICE

(71) Applicant: DENSO CORPORATION, Kariya, Aichi-pref. (JP)

(72) Inventors: Nobuhiro Mizuno, Ichihara (JP); Masahiro Iida, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/761,655

(22) PCT Filed: Jan. 21, 2014

(86) PCT No.: PCT/JP2014/000263
§ 371 (c)(1),
(2) Date: Jul. 17, 2015

(87) PCT Pub. No.: WO2014/115531
PCT Pub. Date: Jul. 31, 2014

(65) Prior Publication Data
US 2015/0354968 A1 Dec. 10, 2015

(30) Foreign Application Priority Data
Jan. 23, 2013 (JP) .................................. 2013-010307

(51) Int. Cl.
*G01C 21/20* (2006.01)
*G09B 29/10* (2006.01)
(Continued)

(52) U.S. Cl.
CPC .............. *G01C 21/20* (2013.01); *G01C 21/32* (2013.01); *G09B 29/00* (2013.01); *G09B 29/106* (2013.01)

(58) Field of Classification Search
CPC ...... G01C 21/20; G01C 21/32; G09B 29/00; G09B 29/106

USPC .......................................................... 701/534
See application file for complete search history.

(56) References Cited

U.S. PATENT DOCUMENTS

| | | | |
|---|---|---|---|
| 2002/0161510 A1 | 10/2002 | Matsuura | |
| 2009/0136103 A1* | 5/2009 | Sonka | G06K 9/4638 382/128 |

(Continued)

FOREIGN PATENT DOCUMENTS

| | | |
|---|---|---|
| JP | H08194892 A | 7/1996 |
| JP | H09185322 A | 7/1997 |

(Continued)

OTHER PUBLICATIONS

International Search Report and Written Opinion (in Japanese with English Translation) for PCT/JP2014/000263, mailed Apr. 8, 2014; ISA/JP.

*Primary Examiner* — McDieunel Marc
*Assistant Examiner* — James E Stroud
(74) *Attorney, Agent, or Firm* — Harness, Dickey & Pierce, P.L.C.

(57) ABSTRACT

A curve modeling device includes a curvature calculation unit, a curvature correction unit, and a node information generation unit. The curvature calculation unit calculates a curvature of each sampling point on a route based on location information of each sampling point. The curvature correction unit corrects the curvature at each sampling point and approximates the route by a straight line interval, an arc interval, or a smooth curve interval. The node information generation unit builds a shape model of a curve included in the route by generating node information indicative of a node location on a road corresponding to the route based on the corrected curvature of the sampling point. The curvature correction unit corrects the curvature under a condition that an orientation difference defined by the calculated curvatures maintains a constant value.

10 Claims, 17 Drawing Sheets

(51) Int. Cl.
*G01C 21/32* (2006.01)
*G09B 29/00* (2006.01)

(56) References Cited

U.S. PATENT DOCUMENTS

| | | | |
|---|---|---|---|
| 2009/0179899 A1* | 7/2009 | Gregory | G06T 13/40 345/473 |
| 2010/0142786 A1* | 6/2010 | Degani | A61B 5/055 382/131 |
| 2010/0225913 A1* | 9/2010 | Trainer | G01N 15/0205 356/338 |
| 2013/0132051 A1* | 5/2013 | Hadap | G06T 11/203 703/6 |
| 2013/0173239 A1* | 7/2013 | Uemura | G06F 17/5009 703/2 |
| 2014/0152986 A1* | 6/2014 | Trainer | G01N 15/0205 356/336 |

FOREIGN PATENT DOCUMENTS

| | | |
|---|---|---|
| JP | 2002329299 A | 11/2002 |
| JP | 2007192582 A | 8/2007 |
| JP | 2013015735 A | 1/2013 |

* cited by examiner

FIG. 18A CURVATURE DATA STORED IN MAP DB

FIG. 18B CALCULATED CURVATURE DATA

CURVE MODELING DEVICE, CURVE MODELING METHOD, AND VEHICULAR NAVIGATION DEVICE

CROSS REFERENCE TO RELATED APPLICATIONS

This application is a U.S. National Phase Application under 35 U.S.C. 371 of International Application No. PCT/JP2014/000263 filed on Jan. 21, 2014 and published in Japanese as WO 2014/115531 A1 on Jul. 31, 2014. This application is based on and claims the benefit of priority from Japanese Patent Application No. 2013-010307 filed on Jan. 23, 2013. The entire disclosures of all of the above applications are incorporated herein by reference.

TECHNICAL FIELD

The present disclosure relates to a curve modeling device, a curve modeling method, and a vehicular navigation device each of which extracts curves from actual travel data and map data.

BACKGROUND ART

There is a widely known navigation device that detects the location of a traveling vehicle using a global positioning system (GPS) receiver and identifies the vehicle location on a map by collating the detected vehicle location with map data stored in a database.

The map data used by such a navigation device is generated by sampling not points on a road at fixed intervals on, for example, a commercially available road map. Then, the node points are extracted and two-dimensional coordinate information about the node points is stored in a storage medium. However, it has been difficult to provide a low-priced car navigation device because the introduction of a map database needs high cost. In view of such circumstances, there is a proposed device that creates map data based on routes actually traveled by a vehicle (for example, refer to Patent Literature 1).

When an electronic road map described in Patent Literature 1 is used, information about node points stored in a storage medium is examined to extract three neighboring node points, and a curvature at each node is obtained by calculating an approximate expression of a circle that passes through the three neighboring node points. Further, an interval including the nodes is approximated and expressed by using a straight line, an arc, or a clothoid curve (a curve changing from a straight line to an arc) based on the value of the calculated curvature. Thus, a highly accurate road map can be displayed using a limited amount of data.

When a vehicle is about to travel on a sharp curve, the shape of the curve should preferably be extracted with higher accuracy in order to enable a driver of the vehicle to properly change the speed of the vehicle with a natural feeling wherever possible. Currently popular vehicular navigation maps are designed to search for a route to a destination and provide route guidance to the destination. However, the currently popular vehicular navigation maps are not accurate enough to provide a driving control yet.

Under the above circumstances, the applicant of the present application proposed a technology that is described in Japanese Patent Application No. 2011-149514 in order to restrict a decrease in accuracy of created map data caused by a measurement error of a location sensor. This technology enables a generation of accurate map information even if a location sensor has a measurement error.

The technology described in Japanese Patent Application No. 2011-149514 can further be improved. More specifically, a steady interval (an arc interval having a constant curvature) existing on an actual road is not found in an actually traveled path. Therefore, the length of the steady interval cannot be accurately quantified even when the above-mentioned technology is used. In such a case, it is difficult to determine an interval that needs a speed control.

PRIOR ART LITERATURES

Patent Literature

[Patent Literature 1] JP H9-185322 A

SUMMARY OF INVENTION

In view of the foregoing difficulties, it is an object of the present disclosure to provide a curve modeling device and a curve modeling method each enables an extraction of an accurate shape of a curve, and it is also an object of the present disclosure to provide a vehicular navigation device that can extract an accurate shape of a curve.

According to a first aspect of the present disclosure, a curve modeling device includes a curvature calculation unit, a curvature correction unit, and a node information generation unit. The curvature calculation unit calculates a curvature at each of multiple sampling points positioned on a route based on location information of each of multiple sampling points. The curvature correction unit corrects the curvature at each of multiple sampling points and approximates the route by a straight line interval, an arc interval, or a smooth curve interval. The curvature to be corrected is calculated by the curvature calculation unit. The node information generation unit builds a shape model of a curve included in the route by generating node information indicative of a location of a node on a road corresponding to the route based on the corrected curvatures of multiple sampling points. The curvature correction unit corrects the curvature at each of multiple sampling points on the route under a condition that an orientation difference defined by the curvatures calculated by the curvature calculation unit maintains a constant value.

In the above device, the orientation difference remains unchanged during building a shape model for a curve based on location information of the sampling points. Thus, accuracy of building the shape model for the curve can be improved.

According to a second aspect of the present disclosure, a curve modeling method includes calculating a curvature at each of multiple sampling points positioned on a route based on location information of each of multiple sampling points, correcting the curvature of each of multiple sampling points on the route, approximating the route by a straight line interval, an arc interval, or a smooth curve interval under a condition that an orientation difference defined by the curvature at each of multiple sampling points maintains a constant value, and building a shape model of a curve included in the route by generating node information indicative of a location of a node on a road corresponding to the route based on the corrected curvatures.

In the above method, the orientation difference remains unchanged during building a shape model for a curve based on location information of the sampling points. Thus, accuracy of building the shape model for the curve can be improved.

According to a third aspect of the present disclosure, a vehicular navigation device includes the curve modeling device according to the first aspect, a navigation unit calculating information of a route destined for a preselected destination based on current location information of a vehicle and road information stored in a storage unit, and a display unit displaying the current location information of the vehicle on a road map.

In the above device, the orientation difference remains unchanged during building a shape model for a curve based on location information of the sampling points. Thus, accuracy of building the shape model for the curve can be improved.

BRIEF DESCRIPTION OF DRAWINGS

The above and other objects, features and advantages of the present invention will become more apparent from the following detailed description made with reference to the accompanying drawings. In the drawings:

FIGS. 18A to 18D are diagrams illustrating a procedure performed during the curvature correction process in the navigation device according to the third embodiment of the present disclosure.

EMBODIMENTS FOR CARRYING OUT INVENTION

Figure 1A:
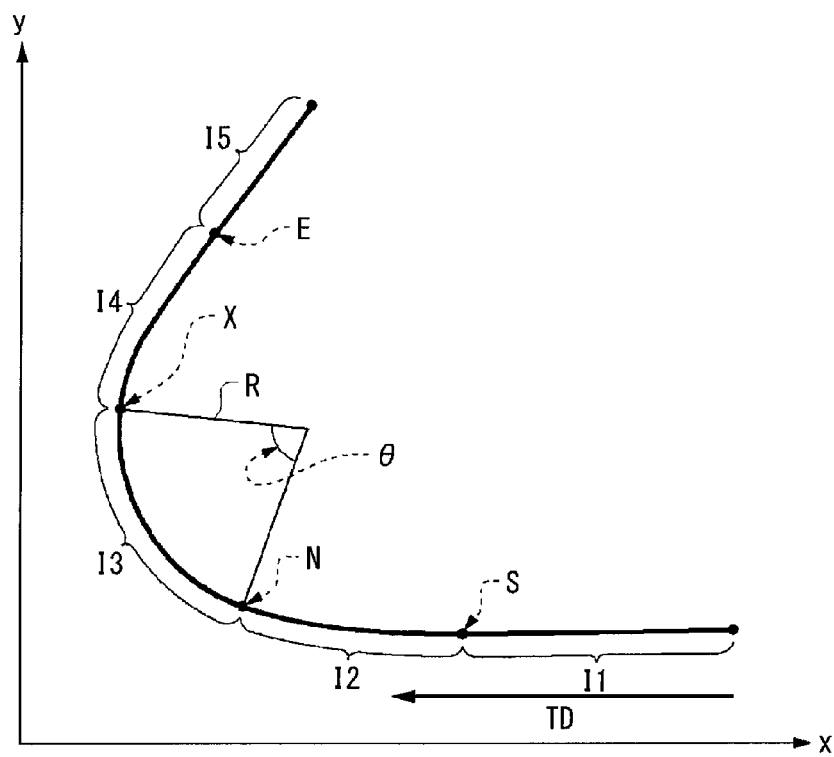
FIGS. 1A and 1B are diagrams illustrating definition of terms used in embodiments of the present disclosure.
Figure 1B:
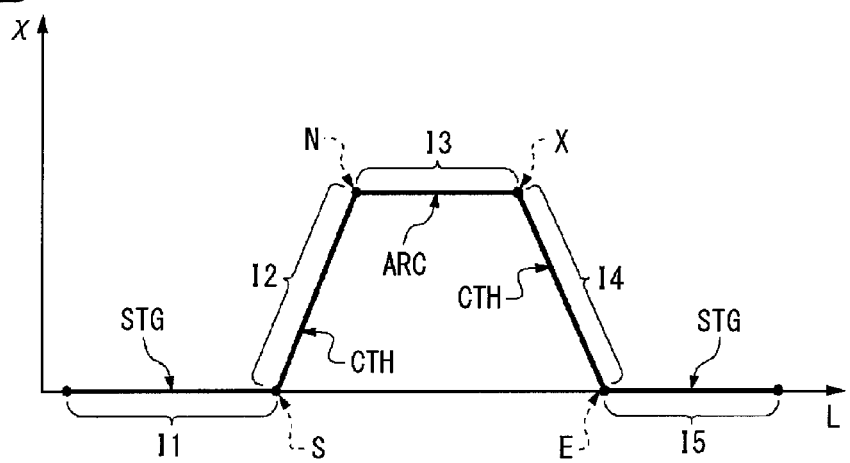

The following will describe embodiments of the present disclosure with reference to the accompanying drawings. The following will describe terms used in the description of the present disclosure. FIG. 1A shows a travel path of a vehicle. FIG. 1B is a graph illustrating how the curvature $\chi$ of the travel path shown in FIG. 1A varies with distance L.

FIG. 1A shows x y coordinates (in terms of latitude and longitude) of a travel path of a vehicle traveling in a traveling direction TD. As shown in FIG. 1A, suppose that the vehicle travels along intervals I1, I2, I3, I4, and I5 in the order named. In this example, as shown in FIG. 1B, the curvature of the traveled path is zero during the interval I, gradually increases during the interval I2, remains constant during the interval I3, decreases to zero during the interval I4, and remains zero during the interval I5.

The intervals I1, I5 having curvatures of zero are straight line intervals (STG). The interval I2 is a clothoid curve interval (CTH) during which the curvature gradually increases. The interval I3 during which the curvature remains constant is a steady interval (ARC). The interval I4 is a clothoid curve interval during which the curvature gradually decreases. The steady interval is hereinafter also referred to as an arc interval.

A point at which switching occurs from the straight line interval I1 to the clothoid curve interval I2 during which the curvature gradually increases is referred to as the "curve start point (S)." A point at which switching occurs from the clothoid curve interval I2 during which the curvature gradually increases to the steady interval I3 is referred to as the "curve entry (N)." A point at which switching occurs from the steady interval I3 to the clothoid curve interval I4 during which the curvature gradually decreases is referred to as the "curve exit (X)." A point at which switching occurs from the clothoid curve interval I4 during which the curvature gradually decreases to the straight line interval I5 is referred to as the "curve end (E)." An angle θ at which the steady interval is formed with respect to the center of the curvature (reference point) is referred to as the "curve depth." The curve depth represents the length of the steady interval.

First Embodiment

Figure 2:
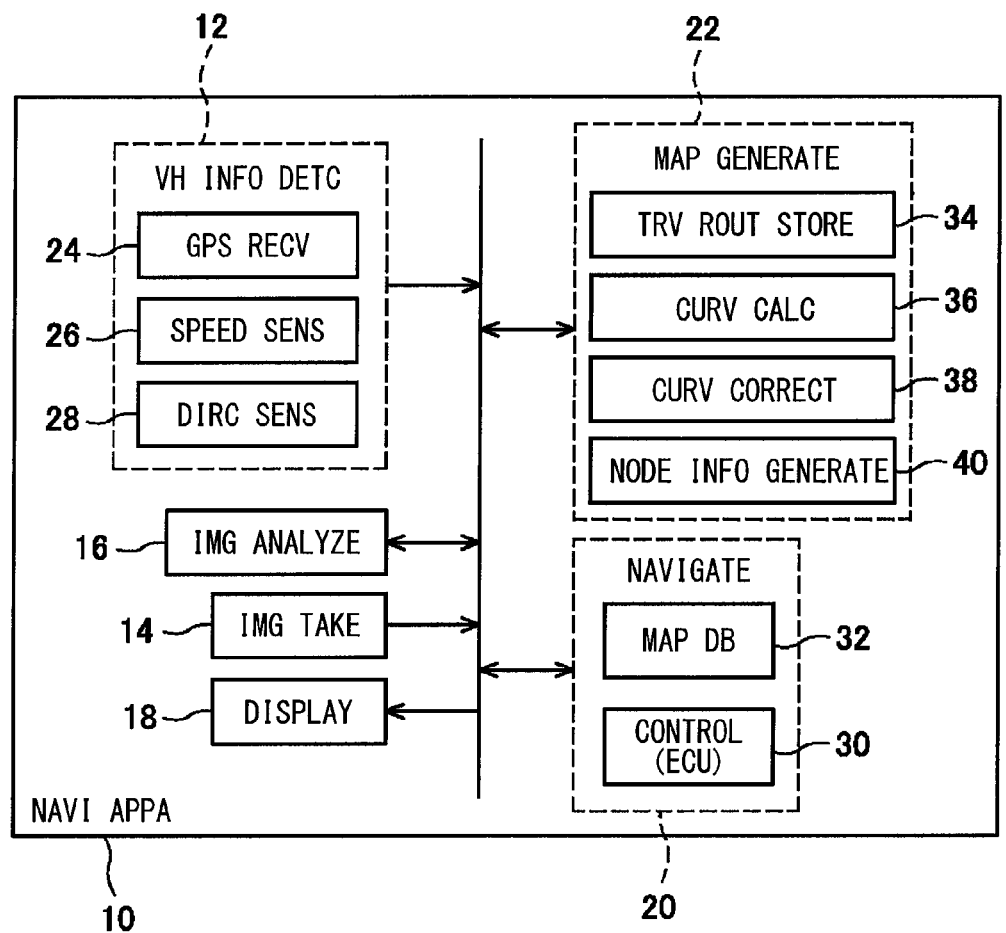
FIG. 2 is a block diagram illustrating a configuration of a navigation device according to a first embodiment to which a curve modeling device according to the present disclosure is applied.

FIG. 2 is a block diagram illustrating a configuration of a vehicular navigation device including a curve modeling device according to a first embodiment of the present disclosure. The navigation device (NAVI APPA) 10 includes a vehicle information detection unit (VH INFO DETC) 12, an image taking unit (IMG TAKE) 14, an image analysis unit (IMG ANALYZE) 16, a display unit (DISPLAY) 18, a navigation unit (NAVIGATE) 20, and a map generation unit (MAP GENERATE) 22. The map generation unit 22 generates a map by building a shape model of curves. The map generation unit 22 corresponds to the curve modeling device, and also corresponds to a map generation device.

The vehicle information detection unit 12 includes, for example, a GPS receiver (GPS RECV) 24, a vehicle speed sensor (SPEED SENS) 26, and a direction sensor (DIRC SENS) 28. The GPS receiver 24 receives radio signals from a GPS satellite to acquire location information (latitude and longitude information) about the vehicle. The vehicle speed sensor 26 measures the traveling speed of the vehicle to acquire vehicle speed information. The direction sensor 28 is provided by a geomagnetic sensor or a gyro sensor and acquires traveling direction information indicative of an absolute direction in which the vehicle travels.

In addition to the above sensors, the vehicle information detection unit 12 may further include, for example, an acceleration sensor for detecting the acceleration of the vehicle, an accelerator opening sensor for detecting an opening degree of the accelerator, a brake sensor for detecting an operating amount of a brake pedal, and a steering sensor for detecting a rotation angle of a steering.

The image taking unit 14 is provided by, for example, a charge-coupled device (CCD) or a CMOS camera that is equipped to a portion near the windshield of the vehicle. For example, a camera attached to a commercially available event data recorder may be used as the image taking unit 14. The image taking unit 14 not only generates an image by capturing an image of a scene ahead of the vehicle, but also outputs captured image data that has been subjected to signal processes, such as a white balance process or a gamma correction process.

The image analysis unit 16 performs a well-known image analysis process to the image captured by the image taking unit 14. Then, the image analysis unit 16 compares the result of the image analysis process with data indicative of previously stored feature amounts of various facilities (road signs, traffic lights, gas stations, convenience stores, hotels, etc.) to detect whether any facility exist near a road on which the vehicle is traveling and detect the types of such facilities.

The display unit 18 is provided by, for example, a liquid-crystal display and provides map information to a driver of the vehicle by displaying, for example, an indicator indicative of a current vehicle location over a map image that is generated from map data stored in a later-described map database 32. Further, when information about a destination is input from an input unit (not shown), the display unit 18 additionally displays information about a route to the destination.

The navigation unit 20 includes a control unit (CONTROL) 30 and a map database (MAP DB) 32. The control unit 30 generates route information for implementing a navigation function. The map database 32 stores map information. The map database 32 is abbreviated as map DB 32. The control unit 30 is implemented by an electronic control unit (ECU) and also referred to as navigation ECU 30. The navigation ECU 30 controls the display unit 18 to display the information about a route to a destination selected by a user on a map image. The navigation ECU also controls the display unit 18 to display the current location of the vehicle over the map image on the basis, for example, of the location, speed, and traveling direction of the vehicle, which are detected by the vehicle information detection unit 12.

The map DB 32 stores node data, facility data, and other information required to prepare a road map. The node data relates to the location and shape of roads forming a map image. The node data includes coordinates (latitude and longitude) of a point (node point) on a road such as a fork in a road (an intersection), the class of road including the node point (information indicative, for example, of a superhighway, highway, or local road), the shape type of road including the node point (straight line interval, arc interval, or clothoid curve interval), and curvature data. The facility data includes data related to information about facilities existing near each node point. The facility data is stored in association with the node data.

The map generation unit 22 generates a road map based on a route along which the vehicle traveled, and includes a traveled route storage unit (TRV ROUT STORE) 34, a curvature calculation unit (CURV CALC) 36, a curvature correction unit (CURV CORRECT) 38, and a node information generation unit (NODE INFO GENERATE) 40. Road map data (node data) generated by the map generation unit 22 is sequentially stored in the map DB 32 of the navigation unit 20.

The traveled route storage unit 34 sequentially stores the location information (latitude and longitude information) about the vehicle, which is detected at fixed time intervals by the vehicle information detection unit 12. A point at which the location information is detected by the vehicle information detection unit 12 is referred to as a "sampling point." Location information received by the GPS receiver 26 may be used as the location information about a sampling point. Vehicle speed information detected by the vehicle speed sensor 28 and traveling direction information detected by the direction sensor 30 may be combined to correct the location information of a sampling point.

Figure 3:
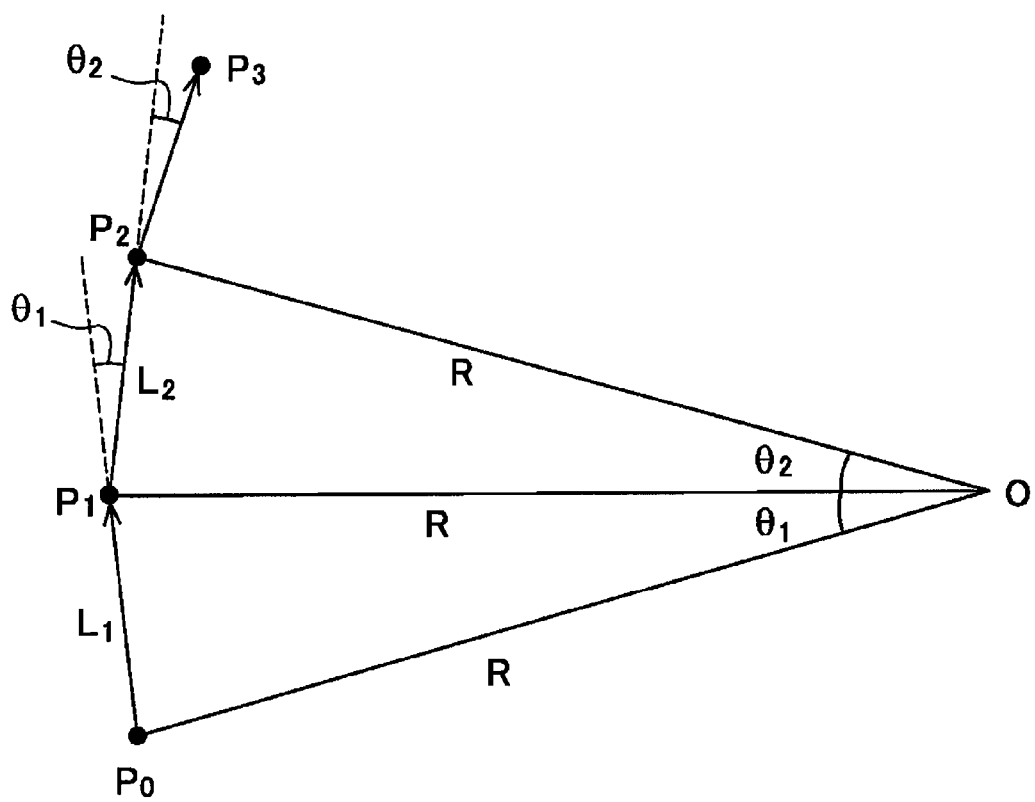
FIG. 3 is a diagram illustrating a method of calculating a curvature at a sampling point on a traveling route according to an embodiment of the present disclosure.

The curvature calculation unit 36 calculates the value of curvature $\chi$ at each sampling point in a manner described below based on the location information of the corresponding sampling point, which is acquired from the traveled route storage unit 34. Referring to FIG. 3, points $P_0$ to $P_3$ are sampling points detected by the vehicle information detection unit 12. Suppose that points $P_0$ to $P_2$ in FIG. 3 are located on the circumference of a circle having radius R and centered at a reference point O. Further, suppose that the angle formed by point $P_0$, reference point O, and point $P_1$ is defined as angle $\theta_1$, and that the angle formed by point $P_1$, reference point O, and point $P_2$ is defined as angle $\theta_2$.

In the above example, the triangle formed by point $P_0$, reference point O, and point $P_1$ is an isosceles triangle. Therefore, the distance $L_1$ between points $P_0$ and $P_1$ can be expressed by the expression below.

$$L_1 = 2 \times R \sin(\theta_1/2) \qquad \text{(Expression 1)}$$

Here, it can be approximated that sampling time intervals are short, and that $\theta_1$ is a small angle. Thus, the following expression can be obtained from Expression 1.

$$R = (1/\chi) = L_1/\theta_1 \qquad \text{(Expression 2)}$$

Here, the value of $L_1$ can be easily calculated based on the location information about the vehicle, which is acquired from the traveled route storage unit 34. Further, referring to FIG. 3, an angle formed by an extended line of a linear segment between points $P_0$ and $P_1$ and a linear segment between points $P_1$ and $P_2$ is equal to the angle $\theta_1$ formed by point $P_0$, reference point O, and point $P_1$. Therefore, the angle $\theta_1$ indicates an angular change in the traveling direction at point $P_1$.

As described above, the value of curvature $\chi$ (=1/R) can be calculated from Expression 2 based on the sampling point interval $L_1$ and the amount of change $\theta_1$ in the traveling angle of the vehicle. This eliminates the necessity of calculating the curvature based on the least-square method of a circle. Thus, the processing load required for calculating the curvature $\chi$ can be reduced. Further, it is possible to avoid a jump of the calculated value of curvature $\chi$.

The triangle formed by point $P_1$, reference point O, and point $P_2$ is also an isosceles triangle. Thus, the curvature $\chi$ (=1/R) can be calculated in the same manner as described above based on the distance $L_2$ between points $P_1$ and $P_2$ and the amount of change ($=\theta_2$) in the traveling angle at point $P_2$.

The curvature can also be determined from the location information of three sampling points as described below. Suppose that the coordinates of points $P_0$, $P_1$, and $P_2$ in FIG. 3 are defined as $P_0$ ($x_0$, $y_0$), $P_1$ ($x_1$, $y_1$), and $P_2$ ($x_2$, $y_2$), respectively. In this case, the radius R and center O (x, y) of a circle that passes through the three points satisfy the following simultaneous expression.

$$(x_0-x)^2+(y_0-y)^2=R^2$$

$$(x_1-x)^2+(y_1-y)^2=R^2$$

$$(x_2-x)^2+(y_2-y)^2=R^2 \quad \text{(Expression 3)}$$

Solving the above simultaneous expression determines the values x, y, and R. Thus, the curvature (1/R) can be calculated. The curvature calculation unit 36 may also use this method to calculate the curvature.

The curvature correction unit 38 corrects the value of curvature $\chi$, which is calculated by the curvature calculation unit 36, so that a road on which the vehicle travels can be classified into the straight line interval, arc interval, or clothoid curve interval. If the straight line interval approximated by a straight line is directly connected to the arc interval having a constant curvature, the driver of the vehicle has to steer a steering wheel abruptly to a steering angle corresponding to the curvature of an arc at a joint between the straight line interval and the arc interval. As such being the case, the clothoid curve interval during which the curvature increases at a constant rate is provided between the straight line interval, which is approximated by a straight line, and the arc interval, which is approximated by an arc. This permits the driver to gradually steer the steering in order to pass through a route that changes from the straight line interval to a curve.

Figure 4:
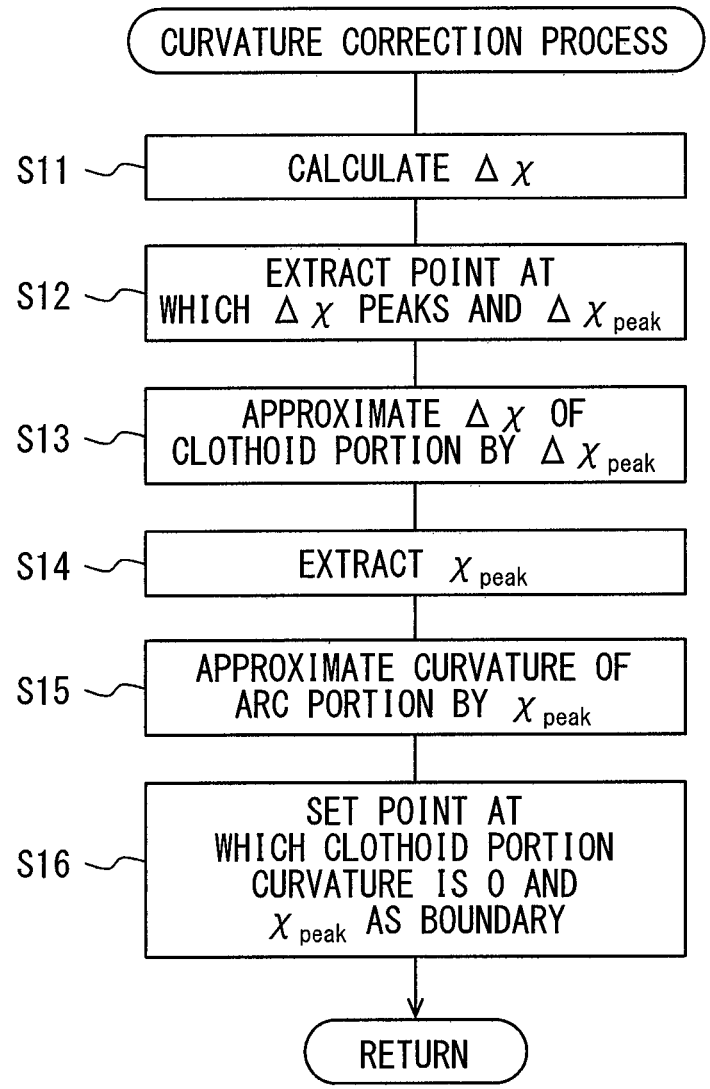
FIG. 4 is a flowchart illustrating a curvature correction process according to a related art.
Figure 5A:
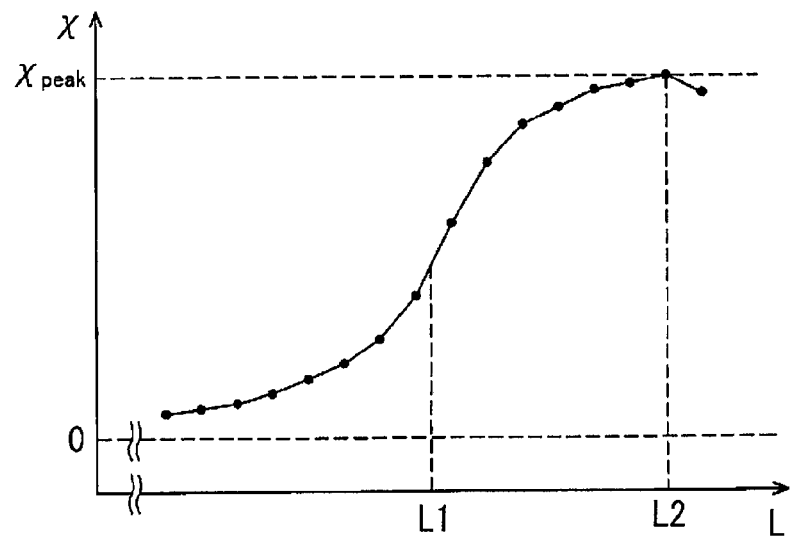
FIGS. 5A to 5C are diagrams illustrating a curvature correction procedure according to a related art.
Figure 5B:
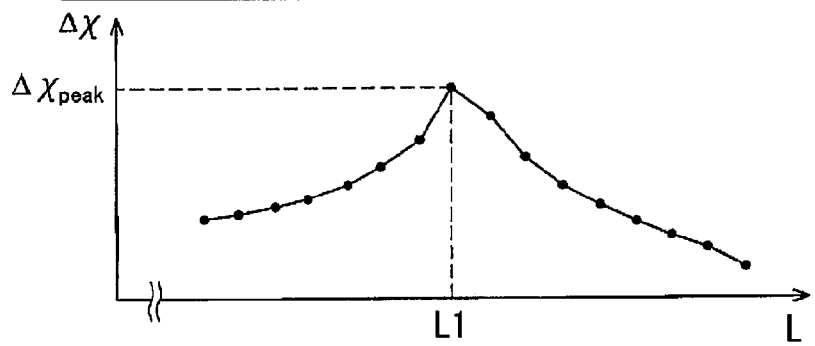
Figure 5C:
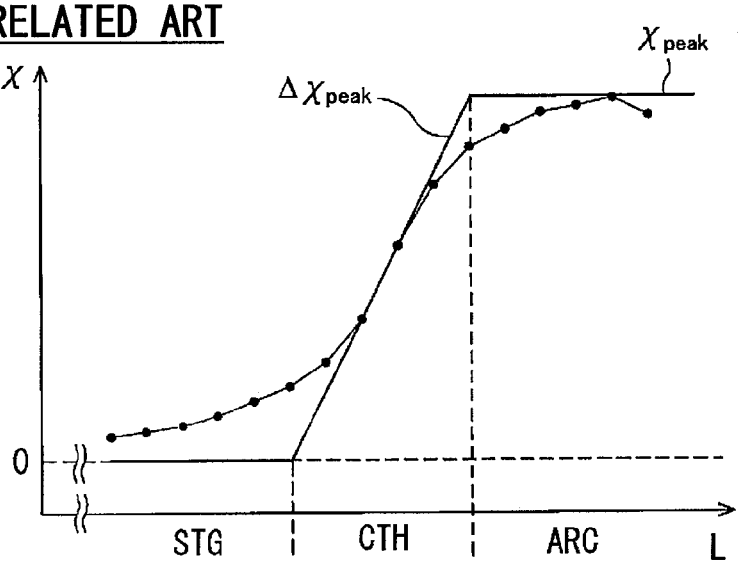

The following will describe a curvature correction process performed by the curvature correction unit 38 based on the technology described in Japanese Patent Application No. 2011-149514 with reference to the flowchart of FIG. 4 and to the diagrams of FIGS. 5A to 5C. FIG. 5A shows the curvature $\chi$ measured at each sampling point. FIG. 5B shows a curvature change amount $\Delta\chi$ that is calculated based on the measured curvature $\chi$. FIG. 5C shows the curvature $\chi$ corrected by the curvature correction unit 38 based on the aforementioned technology and the straight line interval, clothoid interval, and arc interval identified by the curvature correction unit 38 based on the aforementioned technology. In most cases, the curvature $\chi$ calculated by the above method gradually changes, as shown in FIG. 5A, due to measurement errors of various sensors. Therefore, the boundaries between the straight line interval, arc interval, and clothoid curve interval are unclear.

The curvature correction unit 38 calculates the amount of change $\Delta\chi$ in the curvature $\chi$ between two neighboring sampling points (step S11) to obtain a distribution of the curvature change amount $\Delta\chi$ shown in FIG. 5B. Next, the curvature correction unit 38 extracts a peak value $\Delta\chi_{peak}$ of the curvature change amount $\Delta\chi$ and a sampling point representing the peak value (distance $L_1$ in FIG. 5B) (step S12), and approximates the value $\Delta\chi_{peak}$ as the change amount (fixed value) of the curvature $\chi$ in the clothoid curve interval (a straight line having a slope of $\Delta\chi_{peak}$ in FIG. 5C) (step S13). The peak value of the curvature change amount $\Delta\chi$ is also referred to as the maximum curvature change amount.

Next, the curvature correction unit 38 detects a sampling point (L2) at which the curvature $\chi$ has a peak value $\chi_{peak}$ (hereinafter also referred to as the "maximum curvature") (step S14), and approximates a region including the sampling point (L2) as the arc interval having constant curvature ($\chi_{peak}$) (step S15).

The intersection of a straight line having a curvature of $\chi$ in the arc interval and a straight line having a curvature of $\chi$ in the clothoid curve interval is set as a boundary between the clothoid curve interval and the arc interval (curve entry). Further, the intersection of a straight line having a curvature of $\chi$ corresponding to the clothoid curve interval and a portion having a curvature of 0 is set as the boundary between the straight line interval and the clothoid curve interval (curve start point) (step S16). Then, the route traveled by the vehicle can be classified into the straight line interval, the clothoid curve interval, and the arc interval.

Figure 6A:
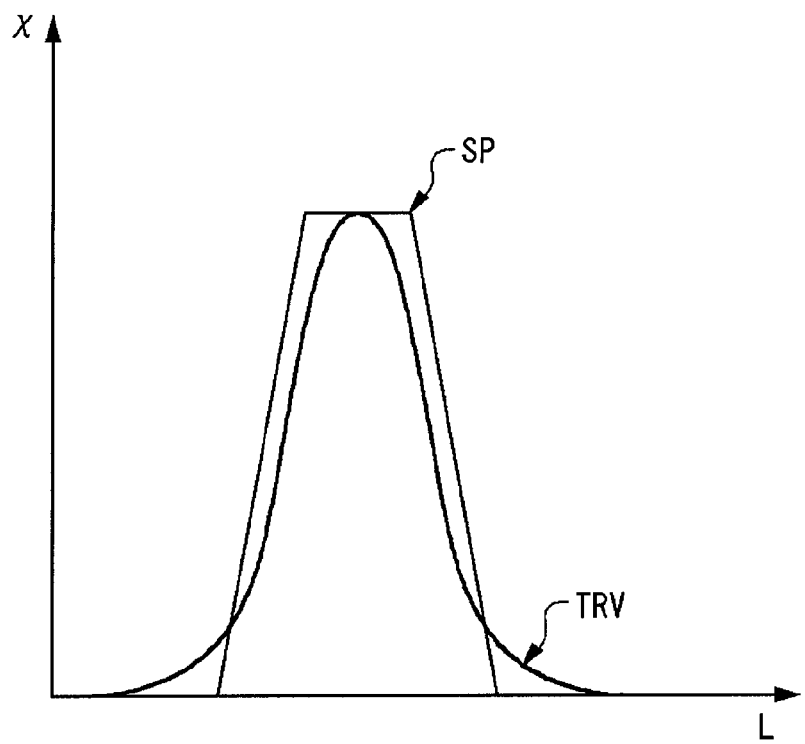
FIGS. 6A and 6B are diagrams illustrating a difficulty existing in a related art.
Figure 6B:
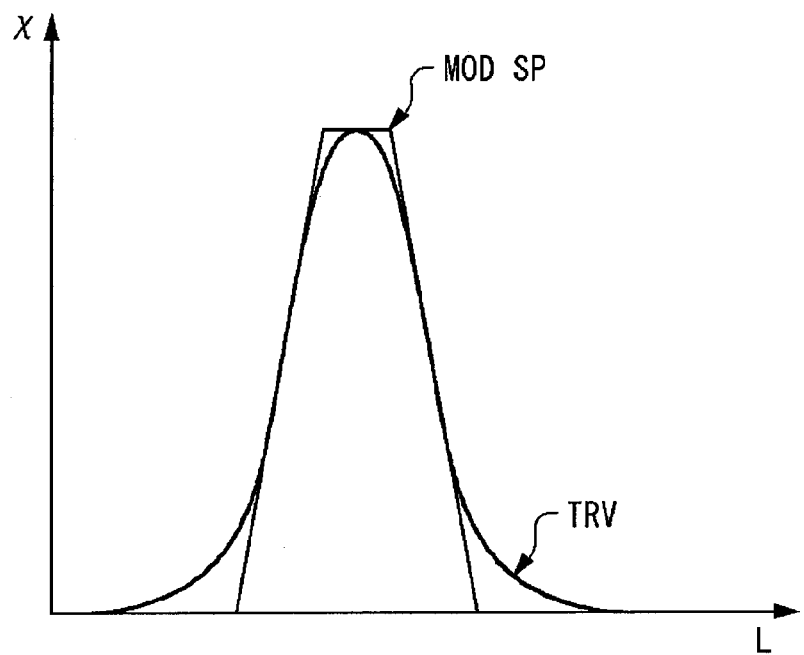

The following will describe improvements made by the curvature correction unit 38 according to the first embodiment of the present disclosure in the above-described technology. FIG. 6A is a graph illustrating the relationship between an actual road line shape (SP) and a traveled path (TRV). When the example shown in FIG. 6A is subjected to the curvature correction process provided by the above-described technology, a modeling road line shape (MOD SP), that is, a curved shape, is obtained as shown in FIG. 6B. The comparison between FIG. 6A and FIG. 6B indicates that the steady interval is shorter than in the actual state caused by the road shape modeling. This is an earlier-described difficulty in which the length of the steady interval cannot be accurately quantified.

Figure 7:
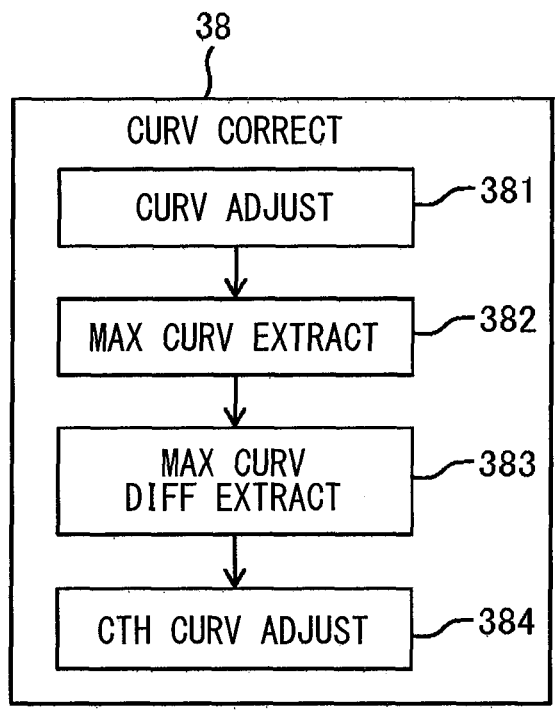
FIG. 7 is a block diagram illustrating a configuration of a curvature correction unit according to an embodiment of the present disclosure.

In view of the above circumstances, the curvature correction unit 38 according to the present embodiment is configured as describe below. FIG. 7 is a block diagram illustrating a configuration of the curvature correction unit 38. The curvature correction unit 38 includes a curvature adjustment unit (CURV ADJUST) 381, a maximum curvature extraction unit (MAX CURV EXTRACT) 382, a maximum curvature change extraction unit (MAX CURV DIFF EXTRACT) 383, and a clothoid curve interval adjustment unit (CTH CURVE ADJUST) 384. The curvature correction unit 38 performs the following process in order to extract the depth of a curve over a certain length. The curvature correction process performed by the curvature correction unit 38 will be described with reference to the flowchart of FIG. 8.

Figure 9:
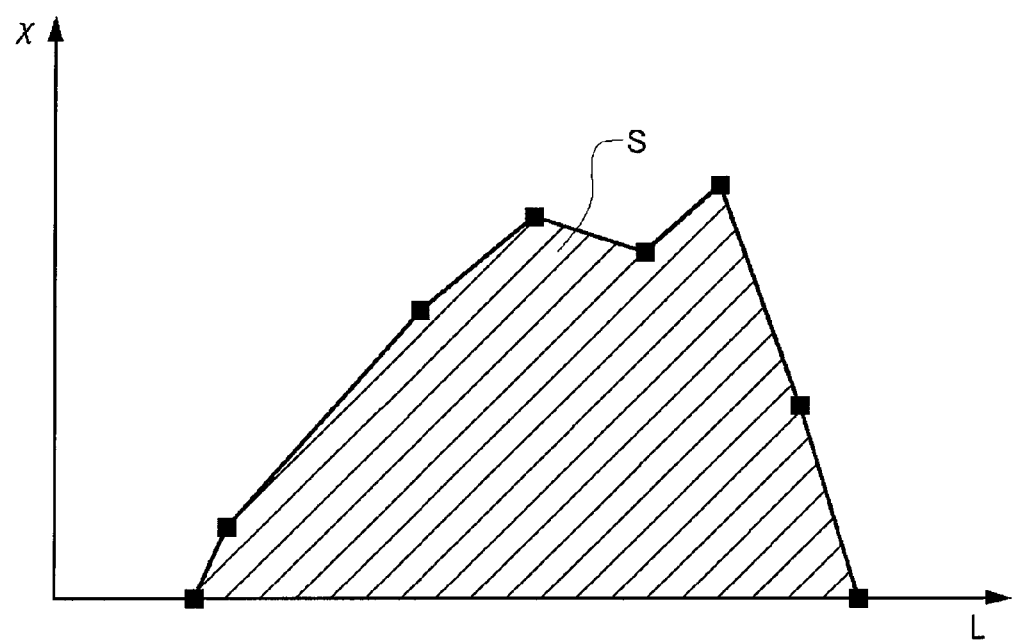
FIG. 9 is a diagram illustrating an orientation difference.

The following will describe an orientation difference involved in a movement from the start point of a curve to the end point of the curve. FIG. 9 shows the orientation difference. Referring to FIG. 9, the vertical axis represents the curvature calculated by the curvature calculation unit 36, and the horizontal axis represents distance. An area S shown in FIG. 9, that is, the integral of the curvature between the curve start point and the curve end point, is the orientation difference. The curvature correction unit 38 corrects the curvature in order to build a shape model of a curve. In such an example, the curvature correction unit 38 corrects the curvature in such a manner that the orientation difference involved in the entire curve remains unchanged. The following will describe details.

Figure 8:
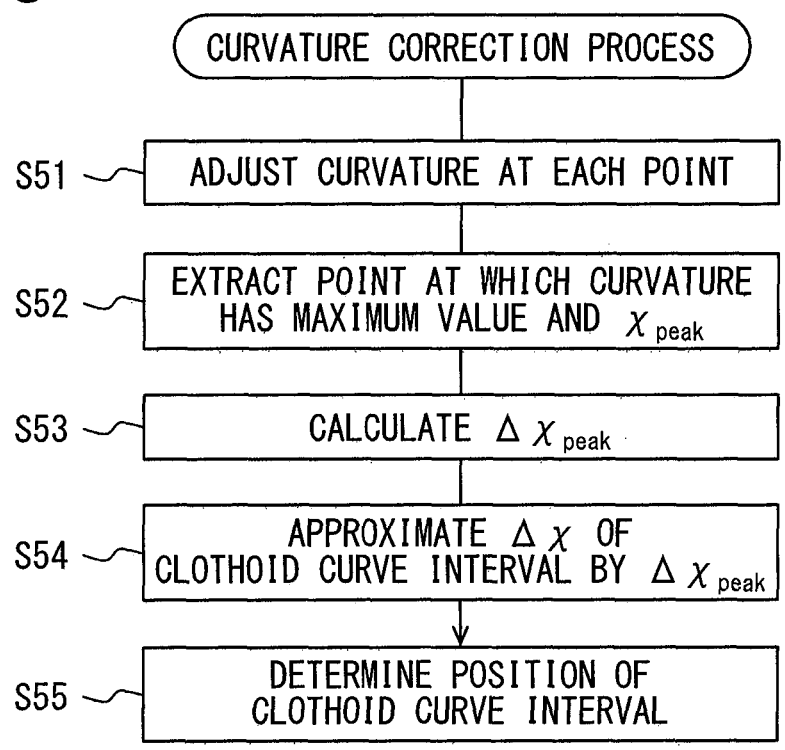
FIG. 8 is a flowchart illustrating a curvature correction process according to an embodiment of the present disclosure.

As shown in FIG. 8, when the curvature correction process starts, the curvature adjustment unit 381 adjusts the curvature at each point (step S51). As regards each point at which the curvature was calculated, the curvature adjustment unit 381 calculates orientation differences within a predetermined range (equalization range) before and after the point of curvature calculation. The predetermined range includes the point of curvature calculation. Then, the curvature adjustment unit 381 determines a uniform curvature within the equalization range that maintains the determined orientation difference. The curvature obtained in this manner is the adjusted curvature at the point. The curvature adjustment unit 381 makes the above-described curvature adjustment at all points. The maximum curvature extraction unit 382 extracts a point at which the curvature adjusted by the curvature adjustment unit 381 is the greatest and extracts the greatest curvature (step S52).

The width in the direction of distance of the equalization range may be a predetermined width that includes the point to be adjusted. The width may also be dynamically adjusted based on the magnitude of the maximum curvature. When a fixed width is to be used, the width is set so that the equalization range is not greater than the steady interval with respect to a curve having the possibly greatest curvature. When the width of the equalization range is to be dynamically set, the width of the equalization range is set so that the greater the maximum curvature, the smaller the width of the equalization range. In this case, the width of the equalization range may be determined either by preparing a function of the magnitude of the maximum curvature or by referencing a table that preliminarily defines the relationship between the magnitude of the maximum curvature and the width of the equalization range. Further, the equalization range need not always be determined so as to equalize the width before the point to be adjusted with the width after the point to be adjusted.

Figure 10A:
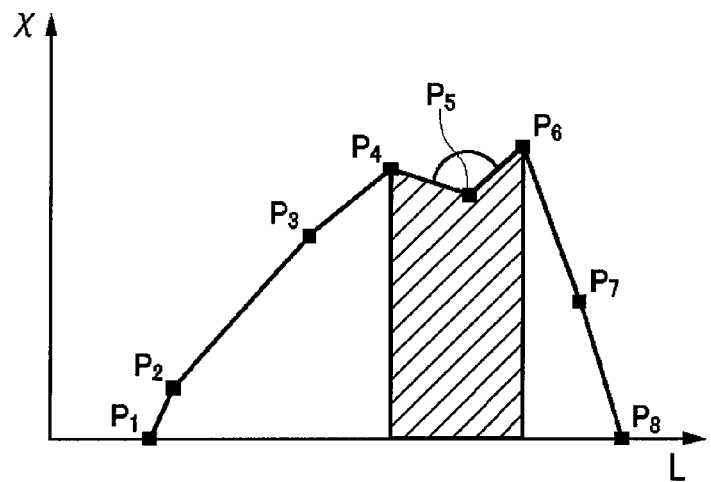
FIGS. 10A to 10C are diagrams illustrating procedures for adjusting the curvature and extracting the maximum curvature according to an embodiment of the present disclosure.
Figure 10B:
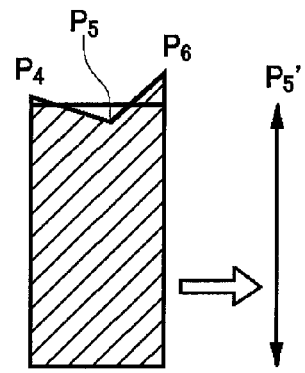
Figure 10C:
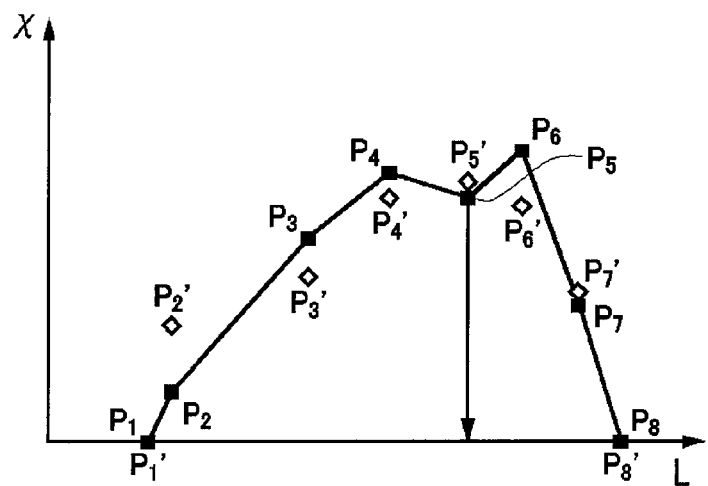

FIGS. 10A to 10C are graphs illustrating a process performed by the curvature adjustment unit 381 and the maximum curvature extraction unit 382. In particular, the graphs show a process performed to adjust the curvature at point $P_5$. When adjusting the curvature at point $P_5$, the curvature adjustment unit 381 calculates the orientation difference in the equalization range, which includes the point $P_5$. In the example of FIGS. 10A to 10C, a range between points before and after the subject point $P_5$ (points $P_4$ and $P_6$) is regarded as the equalization range.

The curvature adjustment unit 381 uniforms the curvature in the equalization range so as to maintain the orientation difference in the equalization range (the area of the shaded region in FIG. 10A). In this example, the area of a rectangle shown in FIG. 10B is equal to the area of the shaded region. The curvature adjustment unit 381 then determines a curvature corresponding to the value of the upper side of the rectangle shown in FIG. 10B as the adjusted curvature $P_5'$ at point $P_5$.

FIG. 10C shows adjusted curvatures $P_1'$ to $P_4'$ and $P_6'$ to $P_8'$, which are obtained when the same process is performed on each of the points $P_1$ to $P_4$ and $P_6$ to $P_8$. The maximum curvature extraction unit 382 extracts a point having the maximum adjusted value as the peak curvature $\chi_{peak}$. In the example of FIGS. 10A to 10C, the maximum curvature extraction unit 382 extracts the adjusted curvature $P_5'$ as the peak curvature.

Here, it is conceivable that an average curvature including the other points included in the equalization range (the surrounding other points) may be regarded as the adjusted curvature at a target point. In the present embodiment, however, such an average curvature is not regarded as the adjusted curvature at the target point. The reason is that point-to-point distances between the sampling points are not equal. If the curvature of actual travel data is smooth, the above-described process need not be performed by the curvature adjustment unit 381 and the maximum curvature extraction unit 382.

As is the case with the above-described technology, the maximum curvature change extraction unit 383 calculates the peak value $\Delta\chi_{peak}$ of the curvature change amount $\Delta\chi$ (step S53) and approximates the amount of change in the curvature in the clothoid curve interval by the calculated peak value $\Delta\chi_{peak}$ (step S54). This process determines the peak change amount of the curvature at each point, which is determined by the curvature calculation unit 36.

The clothoid curve interval adjustment unit 384 performs positioning of the change amount (slope) of the curvature $\chi$ of the clothoid curve interval in the distance direction. Herein, the clothoid curve interval is calculated by the maximum curvature change extraction unit 383 (step S55). Here, the curvature of the steady interval (the peak value $\chi_{peak}$ of curvature) is already obtained. Therefore, determining the position of the change amount (slope) of the curvature $\chi$ of the clothoid curve interval in the distance direction means the determination of the length of the steady interval.

Figure 11A:
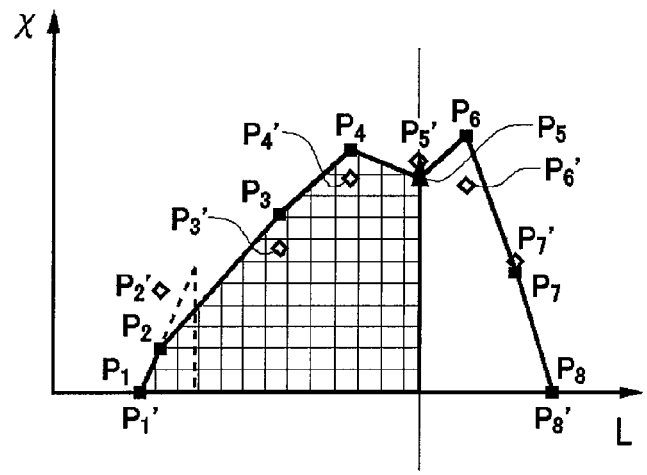
FIGS. 11A to 11D are diagrams illustrating a procedure for adjusting a clothoid curve interval according to an embodiment of the present disclosure.
Figure 11B:
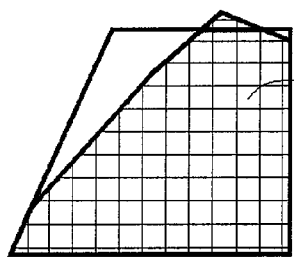
Figure 11C:
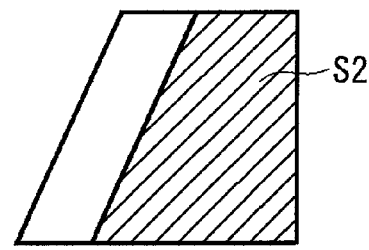

FIGS. 11A to 11D are diagrams illustrating a process that determines the shape of a curve by adjusting the clothoid curve interval. FIG. 11A is a graph illustrating curvature changes and performs the process similarly to the example shown in FIGS. 9 and 10A to 10C. The maximum curvature $\chi_{peak}$ is already determined by the maximum curvature extraction unit 382, and the peak value $\Delta\chi_{peak}$ of the curvature change amount $\Delta\chi$ is already determined by the maximum curvature change extraction unit 383. The clothoid curve interval adjustment unit 384 performs positioning of a straight line having the peak value $\Delta\chi_{peak}$ (slope) of the curvature change amount $\Delta\chi$ in the distance direction.

The clothoid curve interval adjustment unit 384 divides the orientation difference into a left orientation difference and a right orientation difference with a point having the maximum adjusted curvature as the boundary. Regarding the left orientation difference, a trapezoid is formed by the boundary, the maximum curvature $\chi_{peak}$ determined by the maximum curvature extraction unit 382, the base of the graph (a line having a curvature of 0), and a straight line having the slope determined by the maximum curvature change extraction unit 383. The area of the trapezoid changes with a movement of the straight line having the maximum slope in the distance direction. The clothoid curve interval adjustment unit 384 determines the position of the straight line having the maximum slope in the distance direction in such a manner that the area of the trapezoid (the area S2 in FIG. 11C) is equal to the orientation difference calculated from the original curvature (the area S1 in FIG. 11B).

Figure 11D:
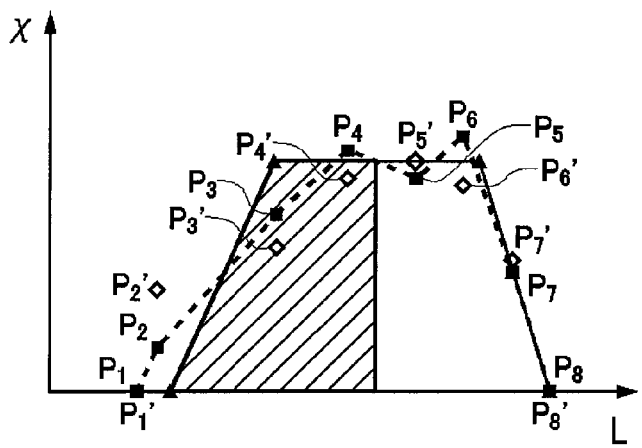

Similarly, for the right orientation difference, the clothoid curve interval adjustment unit 384 performs positioning of the straight line having the maximum slope in the distance direction in the same manner as for the left orientation difference. When the position of the straight line having the maximum slope is determined in the above manner for both the left and right sides (for a case where the curvature increases and for a case where the curvature decreases), the curve start point, the clothoid curve interval during which the curvature increases, the curve entry, the steady interval, the curve exit, and the clothoid curve interval during which the curvature decreases are all determined to finally determine the shape of the curve as shown in FIG. 11D.

When the shape model of a curve is built as described above, the actually measured orientation difference can be maintained. This makes it possible to reduce the deviation of orientation difference from the shape of a road actually traveled by the vehicle that is caused by modeling the curve shape.

The node information generation unit 40 reproduces the shape of a road traveled by the vehicle based on the curvature at each sampling point that is corrected by the curvature correction unit 38, calculates the coordinates of an arbitrarily selected point on the reproduced road and an intersection (node points), and outputs a curve shape model including node data, such as a curve start point, a curve entry, a curve exit, and a curve end point, to the map DB 32. The node data stored in the map DB 32 is read when a navigation operation is to be performed.

Figure 12:
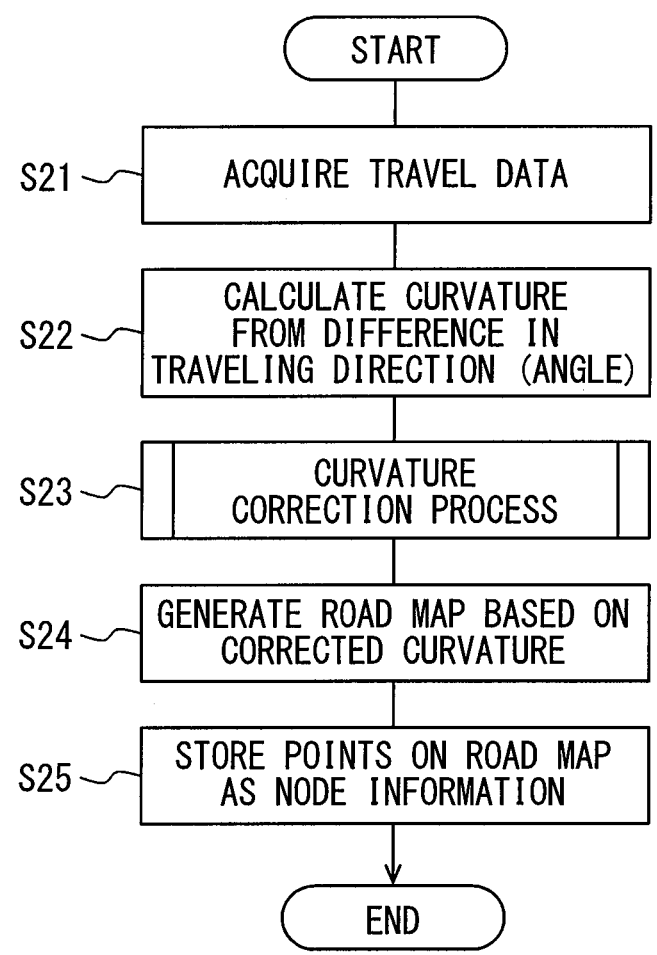
FIG. 12 is a flowchart illustrating a node data generation process according to an embodiment of the present disclosure.

An operation performed by the curve modeling device, which is configured as described above, will now be described with reference to the flowchart of FIG. 12. When the vehicle starts travelling after the navigation device 10 is started up, the vehicle location detection unit 12 acquires travel data including the information about the location of the currently traveling vehicle (step S21). Further, the image taking unit 16 captures an image of a scene ahead of the vehicle to let the image analysis unit 28 acquire information indicative of whether any facilities are shown in the captured image and the types of such facilities.

Data including the location information about sampling points detected by the vehicle location detection unit 12 is stored in the traveled route storage unit 34 included in the map generation unit 22. The curvature calculation unit 36 calculates angular changes in the traveling direction and the distance between sampling points based on the location information about sampling points stored in the traveled route storage unit 34, and calculates the value of curvature $\chi$ at each sampling point based on the information about the angular changes and distance (step S22). This eliminates the necessity of calculating the curvature $\chi$ of a road along the traveling route by using the least-square method of a circle. Thus, the computing load required for processing can be reduced.

The information about the curvature $\chi$, which is acquired by the curvature calculation unit 36, is transmitted to the curvature correction unit 38. The curvature correction unit 38 performs the aforementioned curvature correction process to correct the value of curvature at each sampling point and classify the traveled route into the straight line interval, the clothoid curve interval, or the arc interval (step S23). The node information generation unit 40 generates a road map divided into the straight line interval, the clothoid curve interval, and the arc interval based on a corrected value of curvature, which is derived from the curvature correction process (step S24). Then, the node information generation unit 40 extracts points on the generated road map as node points and outputs information indicative of the coordinates of the node points and the class of road to the map DB 32 as node data (step S25).

In the above-described embodiment, suppose that the clothoid curve interval adjustment unit 384 determines the curve start point and curve entry of a curve shape model by performing positioning of the clothoid curve interval during which the curvature increases, or the clothoid curve interval adjustment unit 384 determines the curve end point and curve exit of the curve shape model by performing positioning of the clothoid curve interval during which the curvature decreases. In this case, when an attempt is made to maintain the orientation difference, the following inconvenience may occur depending on circumstances.

In some cases, the curve start point may be positioned ahead of a point at which the curve started according to the original curvature data, or the curve end point may be positioned behind a point at which the curve ended according to the original curvature data. Thus, for the clothoid curve interval during which the curvature increases, the clothoid curve interval adjustment unit 384 may maintain the orientation difference by setting the lower-limit position in the distance direction so as to prevent the curve start point from being positioned ahead of the point at which the curve started according to the original curvature data and by subsequently increasing the slope of the clothoid curve interval so as to maintain the orientation difference. Further, for the clothoid curve interval during which the curvature decreases, the clothoid curve interval adjustment unit 384 may maintain the orientation difference by setting the upper-limit position in the distance direction so as to prevent the curve end point from being positioned behind the point at which the curve ended according to the original curvature data and by subsequently increasing the slope of the clothoid curve interval so as to maintain the orientation difference.

In some cases, the curve entry may be positioned behind a point at which the curvature is maximized or the curve exit may be positioned ahead of the point at which the curvature is maximized. Thus, for the clothoid curve interval during which the curvature increases, the clothoid curve interval adjustment unit 384 may maintain the orientation difference by setting the upper-limit position in the distance direction so as to prevent the curve entry from being positioned behind the point at which the curvature is maximized and by subsequently increasing the slope of the clothoid curve interval so as to maintain the orientation difference. Further, for the clothoid curve interval during which the curvature decreases, the clothoid curve interval adjustment unit 384 may maintain the orientation difference by setting the lower-limit position in the distance direction so as to prevent the curve exit from being positioned ahead of the point at which the curvature is maximized and by subsequently increasing the slope of the clothoid curve interval so as to maintain the orientation difference.

Second Embodiment

A map generation device according to a second embodiment of the present disclosure will now be described. Regarding a path actually traveled by a vehicle, curves are not always shaped like a trapezoid as described in the first embodiment. In some cases, the curves may have a combined shape.

Figure 13A:
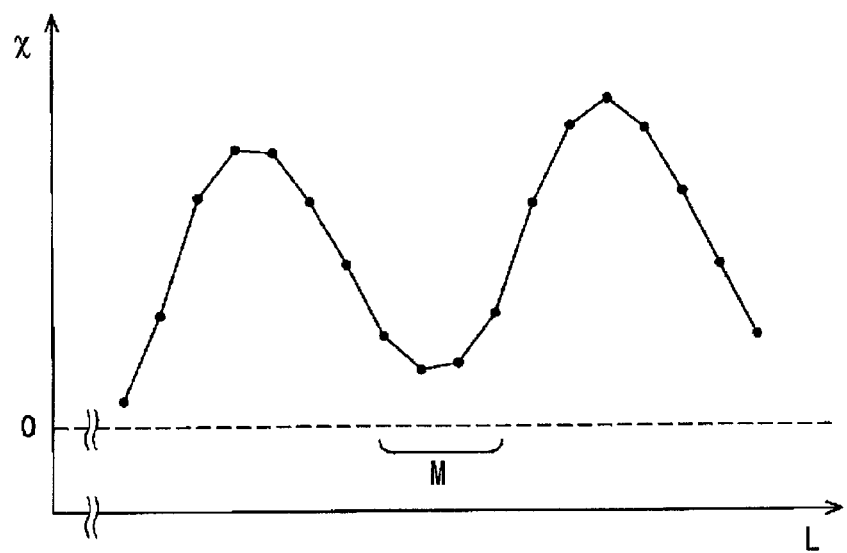
FIGS. 13A and 13B are diagrams illustrating an example of curvature correction made when a combined curve is encountered.
Figure 13B:
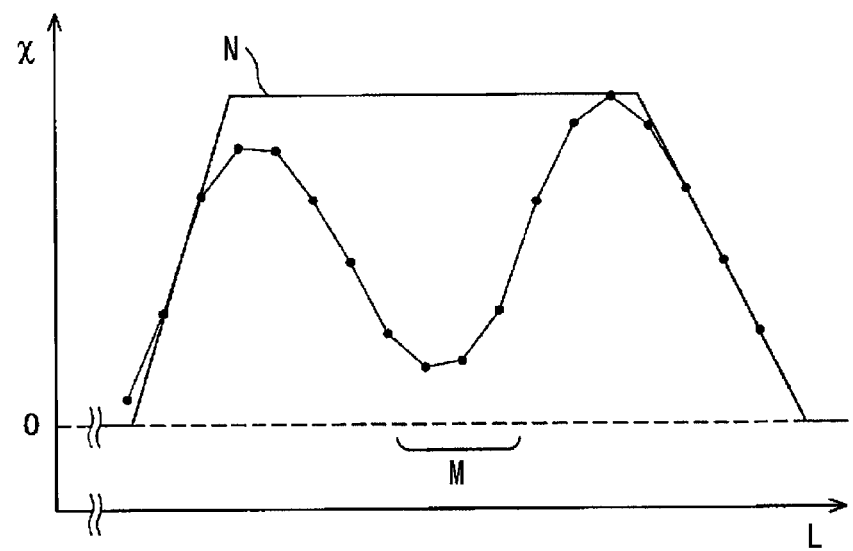

If only a point at which the change amount $\Delta\chi$ of the curvature $\chi$ takes a peak value is extracted and subjected to curvature correction in a situation where the vehicle travels on a road having a smooth curve M (an interval including an arc interval having a curvature smaller than a predetermined value) between successive curves as shown in FIG. 13A, curvature correction may be erroneously made for a region including two curves between which the smooth curve (M), which is a steady interval (arc interval) having a small curvature, is positioned. In such a case, the interval M, which should be determined as a smooth curve, is erroneously corrected, and a shape model of an arc interval having a great curvature (N) is built for the interval M.

Figure 14A:
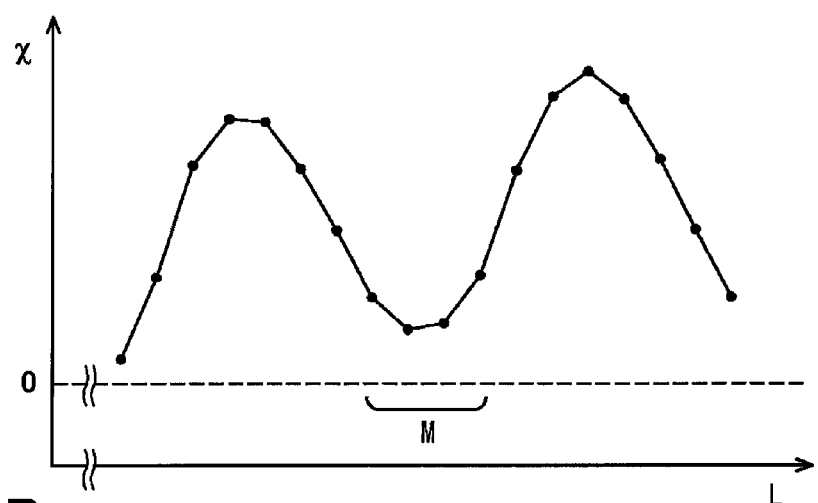
FIGS. 14A to 14C are diagrams illustrating a procedure performed during a curvature correction process in a navigation device according to a second embodiment of the present disclosure.
Figure 14B:
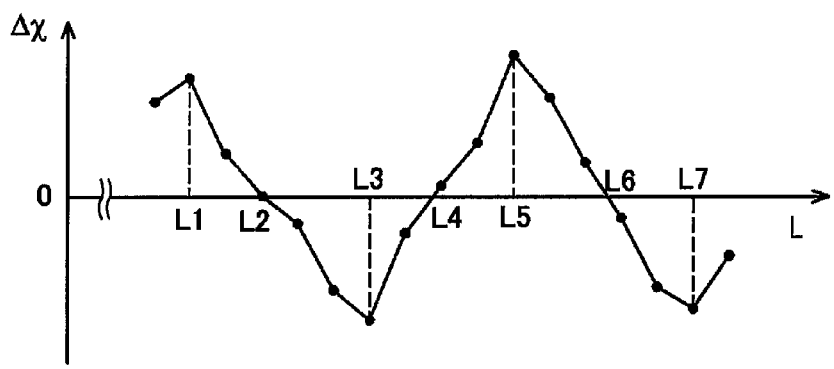

The curve modeling device according to the second embodiment extracts multiple steady intervals between a curve start point and a curve end point. Therefore, as shown in FIG. 14B, the curve modeling device according to the present embodiment not only extracts points (L1, L3, L5, L7) at which the curvature change amount $\Delta\chi$ calculated based on the curvature shown in FIG. 14A takes a peak value, but also extracts points (L2, L4, L6) at which the curvature change amount $\Delta\chi$ takes a value of 0. Then, the curve modeling device according to the present embodiment approximates a region including the extracted points at which the curvature change amount $\Delta\chi$ take a value of 0 as an arc interval, and corrects the curvature. A point at which the curvature change amount $\Delta\chi$ takes a value of 0 and changes from positive to negative is hereinafter referred to as an "upward protruded peak (PK1)," and a point at which the curvature change amount $\Delta\chi$ takes a value of 0 and changes from negative to positive is hereinafter referred to as a "downward protruded peak (PK2)." In other words, the upward protruded peak has a curvature greater than the curvatures of two neighboring sampling points, and the downward protruded peak has a curvature smaller than the curvatures of two neighboring sampling points.

Figure 14C:
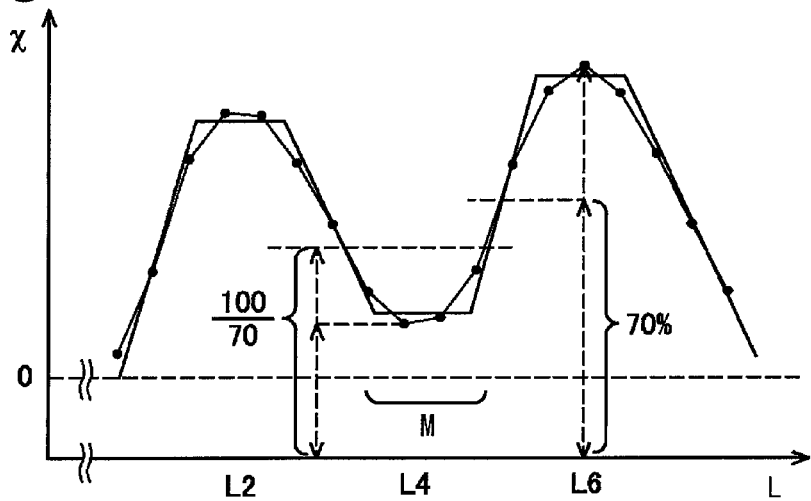

In the above example, when the curvature of the downward protruded peak, which is adjacent to the upward protruded peak in a direction opposite to the traveling direction, is smaller than 70% of the upward protruded peak as shown in FIG. 14C, it is determined that an interval near the downward protruded peak is a smooth curve interval (a steady interval having a small curvature). Further, when an interval near the downward protruded peak is determined to be a smooth curve interval and the curvature of the upward protruded peak is not greater than 100/70 of the curvature of the downward protruded peak even if another upward protruded peak exists near the downward protruded peak, the upward protruded peak may be determined as a steady interval of another curve. When the above-described process is performed, the curvature shown in FIG. 14A is corrected to obtain the curvature shown in FIG. 14C.

In a data string representing input length and curvature, the values "less than 70%" and "100/70" are used as indexes for determining whether a single curve or multiple curves are involved. However, these values are merely examples. Appropriate values may be set as the indexes on the basis, for example, of sensor accuracy (curvature data reliability). Further, the curvature used to calculate the change amount for peak determination may be either a curvature adjusted by the curvature adjustment unit 381 or an original curvature acquired by the curvature calculation unit 36.

Figure 15:
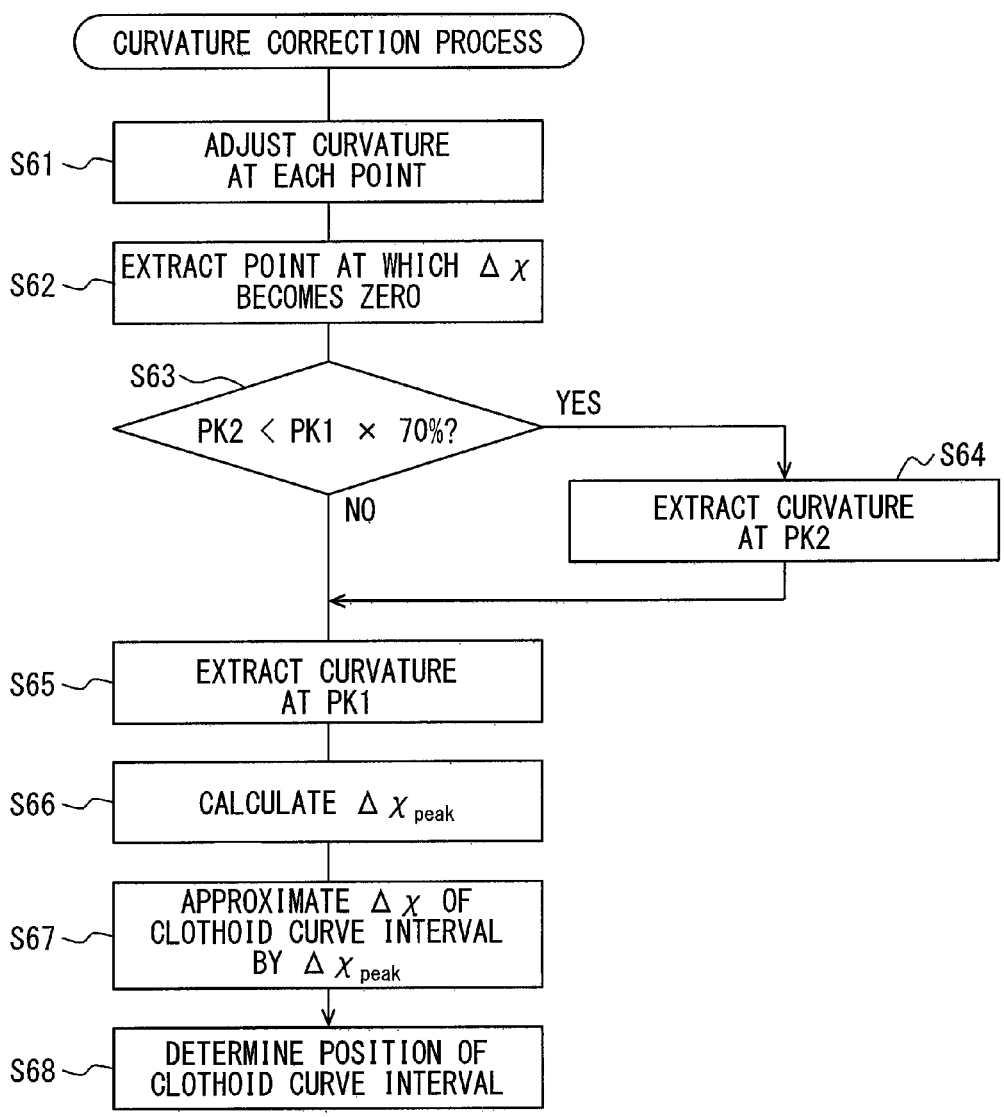
FIG. 15 is a flowchart illustrating a curvature correction process according to the second embodiment of the present disclosure.

FIG. 15 is a flowchart illustrating the curvature correction process performed by the curve modeling device according to the second embodiment of the present disclosure. The curvature adjustment unit 381 adjusts the curvature at each point by equalizing the orientation difference within the equalization range in the same manner as described above (step S61). Next, the maximum curvature extraction unit 382 determines the change amount $\Delta\chi$ of the curvature at each point, which was adjusted by the curvature adjustment unit 381, and determines a point at which the curvature change amount $\Delta\chi$ is equal to zero (step S62).

The maximum curvature extraction unit 382 compares the curvature of the upward protruded peak against the curvature of the downward protruded peak positioned ahead of the upward protruded peak along the distance axis, and determines whether the curvature of the downward protruded peak is smaller than 70% of the curvature of the upward protruded peak (step S63). If the curvature of the downward protruded peak is smaller than 70% of the curvature of the upward protruded peak (YES in step S63), the maximum curvature extraction unit 382 identifies an interval including the downward protruded peak as a smooth curve interval and extracts the curvature of the downward protruded peak as the curvature of the smooth curve interval (step S64).

After the curvature of the smooth curve interval is extracted (after completion of step S64), or the result of determination in step S63 does not indicate a smooth curve (NO in step S63), the maximum curvature extraction unit 382 extracts the curvature of the upward protruded peak as the maximum curvature (step S65).

As is the case with the above-described technology, the maximum curvature change extraction unit 383 calculates the peak value $\Delta\chi_{peak}$ of the curvature change amount $\Delta\chi$ (step S66) and approximates the amount of change in the curvature $\chi$ in the clothoid curve interval by the calculated peak value $\Delta\chi_{peak}$ (step S67). Here, when the curvature of the smooth curve interval is extracted by the maximum curvature extraction unit 382, the maximum curvature change extraction unit 383 also extracts the peak value $\Delta\chi_{peak}$ of the curvature change amount of both sides of the smooth curve interval.

The clothoid curve interval adjustment unit 384 performs positioning of the change amount (slope) of the curvature $\chi$ in the clothoid curve interval, which is calculated by the maximum curvature change extraction unit 383 (step S68). In the present embodiment, the clothoid curve interval adjustment unit 384 divides the orientation difference at the point of maximum curvature extracted by the maximum curvature extraction unit 382 and at each point at which the curvature of the smooth curve interval is obtained, and performs positioning of the clothoid curve interval in such a manner as to maintain the divided orientation differences.

Consequently, even when the curvature is corrected in a region including two curves between which a smooth curve is positioned, the interval of the smooth curve can be accurately extracted. This configuration enables a generation of map information having a higher accuracy.

In the above-described embodiment, it is assumed that the criterion for identifying a smooth curve is less than 70% of the upward protruded peak. However, this criterion may be changed as appropriate. More specifically, if a downward protruded peak is determined to be lower than an upward protruded peak based on a predetermined criterion, the maximum curvature extraction unit 382 may determine that an interval including the downward protruded peak is a smooth curve interval. For example, the criterion may be such that the difference between an upward protruded peak and a downward protruded peak should be not smaller than a predetermined curvature.

Third Embodiment

The following will describe a curve modeling device according to a third embodiment of the present disclosure. When the vehicle travels on a previously traveled road, the curve modeling device according to the third embodiment performs the curvature correction process after updating curvature data by using curvature data calculated based on detected location information and curvature data stored in the map DB.

Figure 16:
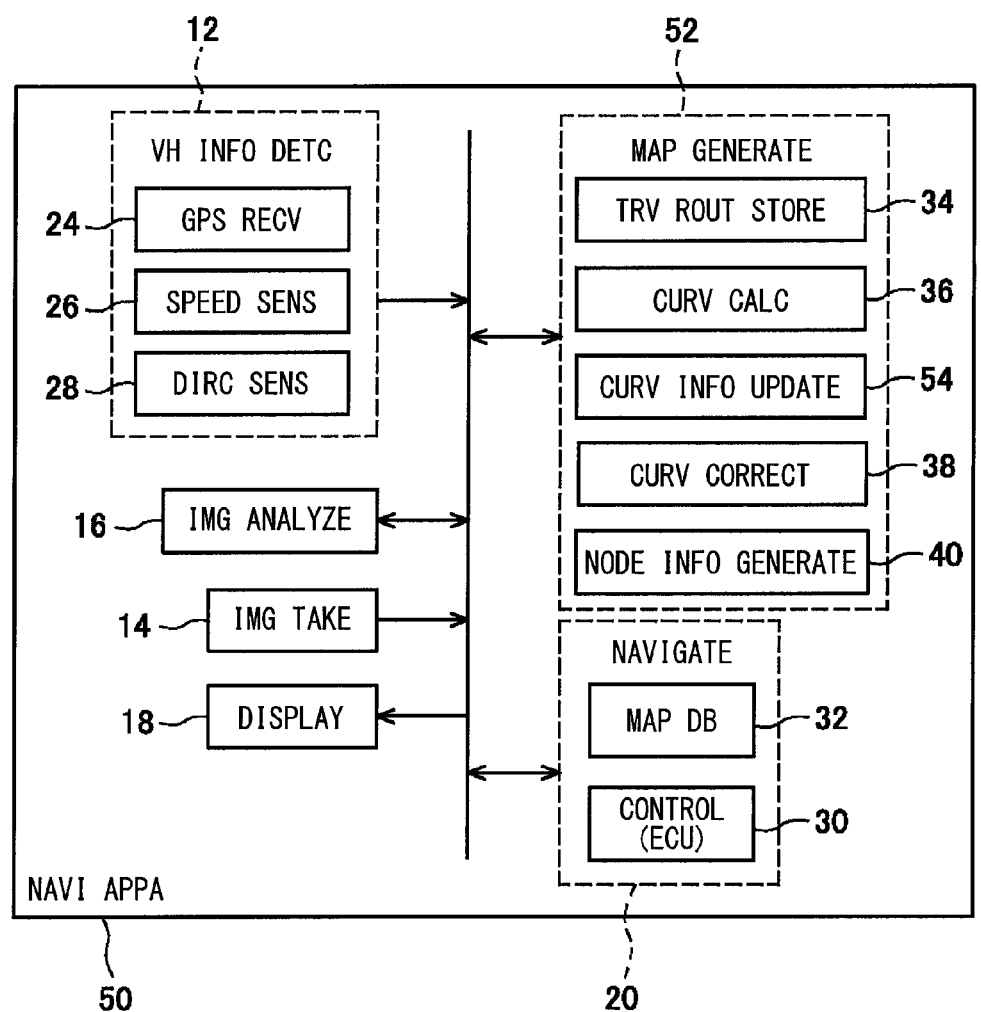
FIG. 16 is a block diagram illustrating a configuration of a navigation device according to a third embodiment of the present disclosure.

FIG. 16 is a block diagram illustrating a navigation device (NAVI APPA) 50 having the curve modeling device according to the third embodiment. This block diagram differs from the block diagram of FIG. 2 in that a map generation unit (MAP GENERATE) 52 additionally includes a curvature information update unit (CURV INFO UPDATE) 54. Elements that are shown in the block diagram of FIG. 16 and equivalent to those described with reference to FIG. 2 are designated by the same reference numerals and will not be redundantly described in detail.

The curvature information update unit 52 receives the curvature data acquired by the curvature calculation unit 36. Further, if curvature data on the associated road exists in the map DB 32, the curvature information update unit 52 reads out the curvature data from the map DB 32 and updates the curvature data on the road with the weighted average of the readout curvature data. Subsequently, the curvature correction unit 38 performs the curvature correction process.

Figure 17:
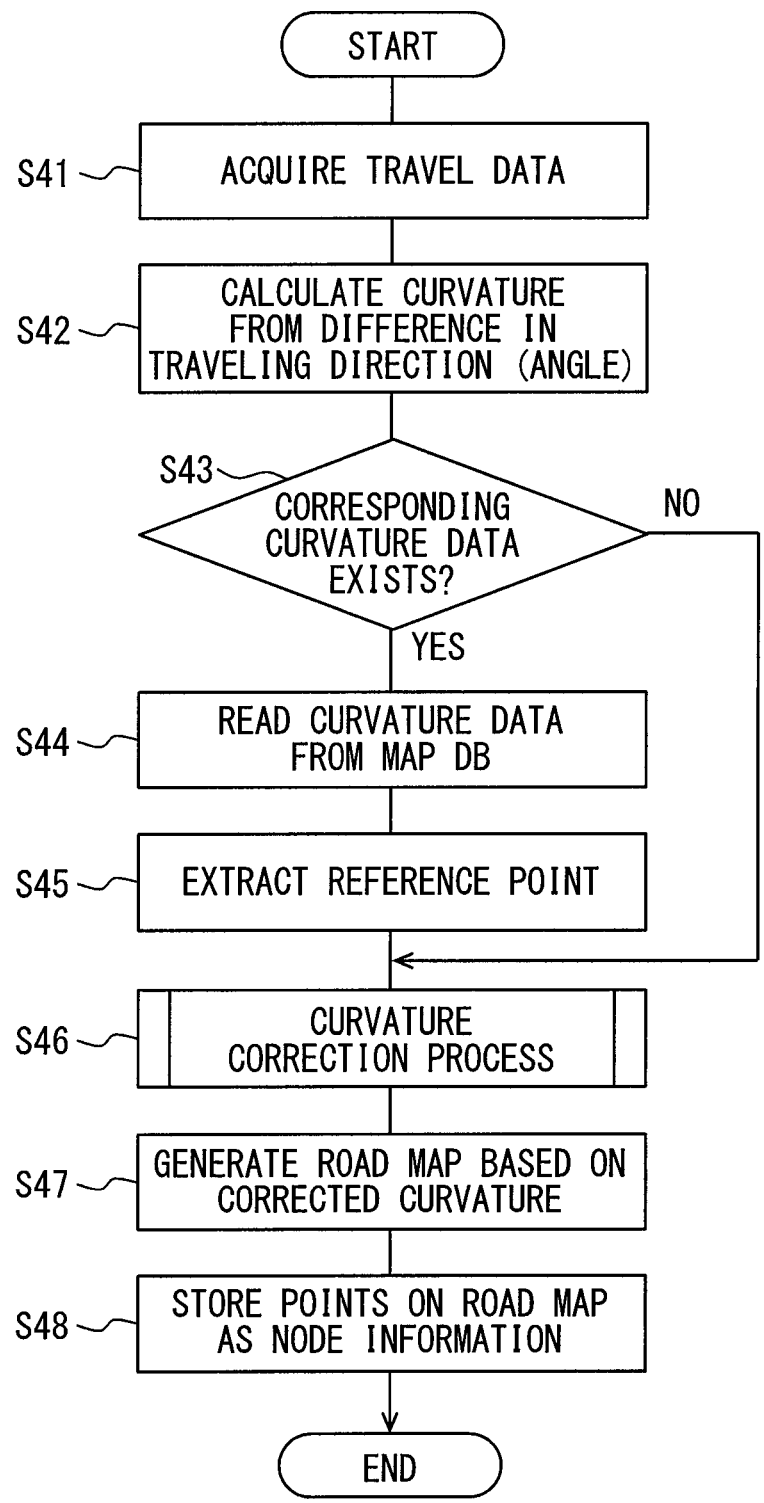
FIG. 17 is a flowchart illustrating a curvature correction process according to the third embodiment of the present disclosure.

FIG. 17 is a flowchart illustrating map generation process performed in the present embodiment. When the vehicle starts travelling after the navigation device 10 is started up, the vehicle location detection unit 12 acquires travel data including the information about the location of the currently traveling vehicle so that the acquired travel data is stored in the traveled route storage unit 34 in the map generation unit 52 (step S41). Next, the curvature calculation unit 36 calculates angular changes in the traveling direction and the traveled distance based on the location information about sampling points stored in the traveled route storage unit 34, and calculates the value of curvature $\chi$ at each sampling point based on the calculated angular changes and traveled distance (step S42).

Next, the curvature information update unit 54 determines whether the map DB includes node data about a road corresponding to the road about which the curvature $\chi$ was calculated (determines whether a road map is already generated for the currently travelling road) (step S43). This step can be completed, for example, by determining whether the map DB 32 stores node data that substantially coincides with the latitude and longitude information about a sampling point detected by the vehicle information detection unit or by determining whether the map DB 32 stores facility information about an identical facility analyzed by the image analysis unit 16.

If the map DB includes the road data about the currently travelling road (YES in step S43), the curvature information update unit 54 reads out the node data (curvature data) about the relevant road (step S44), and calculates the average value of the readout curvature data and the currently calculated curvature data (or performs a predetermined weighted computation process) to determine reference points for curvature correction.

Figure 18C:
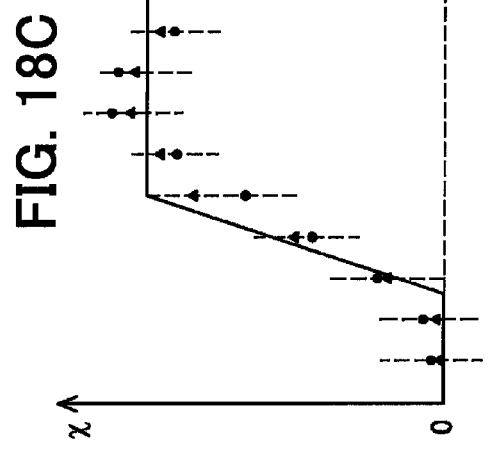
Figure 18C:
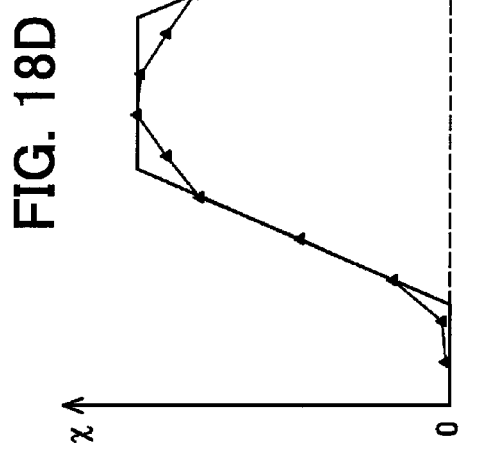
Figure 18C:
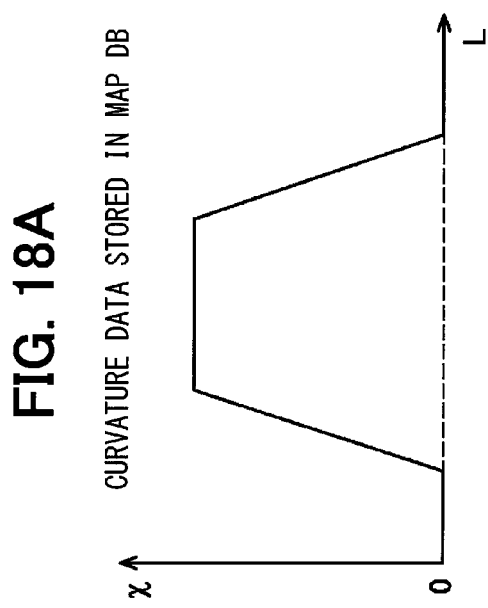
Figure 18D:
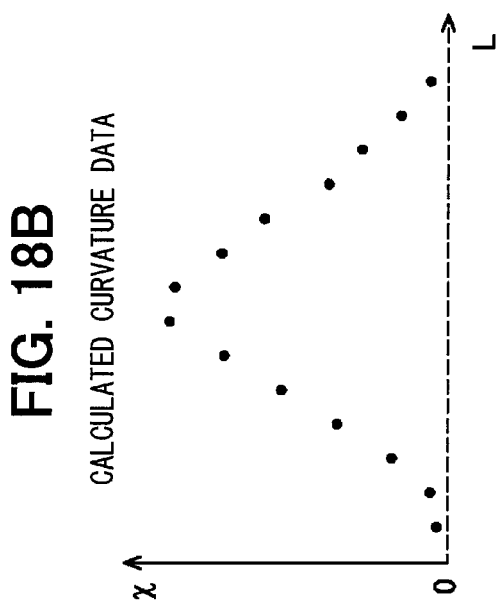

More specifically, the curvature at the reference points (points marked by a black triangle in FIG. 18C) is calculated by calculating the average value of (or by performing a weighted computation process on) the curvature at the subject sampling point, which is calculated by the curvature calculation unit 36 and shown in FIG. 18B, and the curvature at the subject sampling point stored in the map DB, which is shown in FIGS. 18B and 18A (step S45). Subsequently, the same curvature correction process as described in the first embodiment (or in the second embodiment) is performed based on the calculated curvature at the reference points as shown in FIG. 18D (step S46).

The node information generation unit 40 generates a road map including the straight line interval, the clothoid curve interval, and the arc interval based on a corrected value of curvature, which is derived from the curvature correction process (step S47). Next, the node information generation unit 40 extracts points on the generated road map as node points and outputs information indicative of the coordinates of the node points and the class of road to the map DB 32 as node data (step S48). The node data in the map DB 32 is then updated.

As described above, the node data stored in the map DB is updated each time the vehicle travels on the same road. This makes it possible to generate a more accurate road map, for example, of roads on which the vehicle regularly travels.

If the map DB does not store the road data about the currently travelling road (NO in step S43), the node data is stored in the map DB 32 after the curvature correction process is performed to generate a road map, as is the case with the first embodiment.

In the foregoing embodiments, it is assumed that the interval between the straight line interval and the arc interval is the clothoid curve interval during which the curvature changes at a constant rate. However, the present disclosure is not limited to such an interval arrangement. The interval between the straight line interval and the arc interval may be approximated by any kind of smooth curve (for example, a spline curve or a Bézier curve).

Further, the curve modeling device according to the first to third embodiments includes the traveled route storage unit 34, and the curvature calculation unit 36 of the curve modeling device calculates the curvature from the traveled path of the vehicle, which is stored in the traveled route storage unit 34. Meanwhile, the curve modeling device according to the present disclosure may include a map data storage unit that, instead of the traveled route storage unit 34, acquires and stores map data including the location information about sampling points on routes included in a map, and the curvature calculation unit 36 of the curve modeling device may calculate the curvature based on the map data stored in the map data storage unit and extract the shape of a curve for modeling purposes. In such an example, the curvature calculation unit 36 is also referred to as a map data acquisition unit.

As described above, the embodiments of the present disclosure are capable of extracting the shape of a curve at a higher accuracy and can be applied as, for example, a curve modeling device.

The present disclosure includes the following aspects.

A curve modeling device according to a first aspect of the present disclosure includes a curvature calculation unit, a curvature correction unit, and a node information generation unit. The curvature calculation unit calculates the curvature at each of multiple sampling points positioned on a route based on location information about each sampling point. The curvature correction unit corrects the curvature at each of the sampling points, which is calculated by the curvature calculation unit, in such a manner that the route is approximated by a straight line interval, an arc interval, or a smooth curve interval. The node information generation unit builds the shape mode of a curve included in the route by generating node information indicative of the location of a node on a road corresponding to the route based on multiple corrected curvatures at the sampling points. The curvature correction unit corrects the curvature of the route in such a manner to maintain an orientation difference based on the curvature calculated by the curvature calculation unit with respect to each of the sampling points.

According to the above-described curve modeling device, when the shape model of a curve is to be built based on location information about sampling points, an orientation difference involved in a movement on the entire curve maintains a constant value without being changed. Consequently, the shape model of the curve can be built with a higher accuracy.

Further, the route includes multiple sampling intervals that are determined by two neighboring sampling points of multiple sampling points. The curvature calculation unit may calculate a curvature change amount of each of multiple sampling intervals based on the curvatures of the sampling points. The curvature correction unit may include a maximum curvature extraction unit, a maximum curvature change extraction unit, and a smooth curve interval adjustment unit. The maximum curvature extraction unit extracts a maximum curvature from the corrected curvatures at the sampling points. The maximum curvature change extraction unit extracts a maximum curvature change amount from multiple curvature change amounts of the sampling intervals, which are calculated by the curvature calculation unit. The smooth curve interval adjustment unit determines the position of the smooth curve interval having a slope equivalent to the maximum curvature change amount in such a manner as to maintain the orientation difference of a side on which a sampling interval from which the maximum curvature change amount is extracted is positioned with a sampling point having the maximum curvature as the boundary. In this configuration, the orientation difference of both sides maintains a constant value with the sampling point having the maximum curvature as the boundary. This makes it possible to reduce the degree of inaccuracy in curve modeling that will unduly shorten the arc interval by positioning the smooth curve intervals on both sides too close to each other.

Further, the curvature correction unit may include a curvature adjustment unit and a maximum curvature extraction unit. The curvature adjustment unit equalizes the curvature within an equalization range with respect to each of multiple sampling points in such a manner as to maintain the orientation difference within the equalization range including the sampling points and defines the curvature equalized within the equalization range as a corrected curvature. The maximum curvature extraction unit extracts the maximum curvature from multiple corrected curvatures obtained by the curvature adjustment unit. The maximum curvature may be defined as the curvature of the arc interval. With this configuration, the value of curvature (peak curvature) of the arc interval can be adjusted to increase the degree of accuracy in curve modeling.

Further, the route includes multiple sampling intervals that are determined by two neighboring sampling points of multiple sampling points. The curvature calculation unit may calculate a curvature change amount of each of multiple sampling intervals based on the curvatures of the sampling points. The curvature correction unit may include a maximum curvature change extraction unit and a smooth curve interval adjustment unit. The maximum curvature change extraction unit extracts a maximum curvature change amount from multiple curvature change amounts of multiple sampling intervals, which are calculated by the curvature calculation unit. The smooth curve interval adjustment unit determines the position of the smooth curve interval having a slope equivalent to the maximum curvature change amount in such a manner as to maintain the orientation difference of a side on which a sampling interval from which the maximum curvature change amount is extracted is positioned with a sampling point having the maximum curvature as the boundary. In this configuration, the orientation difference of both sides maintains a constant value with the sampling point having the maximum curvature as the boundary. This makes it possible to reduce the degree of inaccuracy in curve modeling that will unduly shorten the arc interval by positioning the smooth curve intervals on both sides too close to each other.

Further, the curvature correction unit may include a maximum curvature extraction unit. The maximum curvature extraction unit extracts an upward protruded peak having a curvature greater than two neighboring curvatures and a downward protruded peak having a curvature smaller than two neighboring curvatures from multiple corrected curvatures at multiple sampling points. When the downward protruded peak is determined to be lower than the upward protruded peak based on a predetermined criterion, the maximum curvature extraction unit extracts the downward protruded peak as the peak of a smooth curve and extracts the upward protruded peak as the maximum curvature. An interval including the peak of the smooth curve may be defined as an arc interval having a curvature smaller than a predetermined value, and an interval including the upward protruded peak may be defined as the arc interval. With this configuration, the degree of accuracy in curve modeling can also be increased for a combined curve that includes multiple arc intervals including one or multiple smooth curves between a curve start point and a curve end point.

A curve modeling method according to a second aspect of the present disclosure includes calculating the curvature at each of multiple sampling points on a route based on location information about each of the sampling points; correcting the curvature at each of the sampling points in such a manner as to approximate the route by a straight line interval, an arc interval, or a smooth curve interval and maintain an orientation difference based on the curvature at each of the sampling points, and building a shape model for a curve included in the route by generating node information indicative of the location of a node on a road corresponding to the route based on the corrected curvature.

According to the above-described curve modeling method, when the shape model of a curve is to be built based on location information about sampling points, an orientation difference involved in a movement on the entire curve maintains a constant value without being changed. Consequently, the modeling of curve shape can be carried out with a higher accuracy.

A vehicular navigation device according to a third aspect of the present disclosure includes a curve modeling device according to the first aspect of the present disclosure, a navigation unit, and a display unit. The navigation unit calculates information about a route destined for a preselected destination based on current location information about a vehicle and road information stored in a storage unit. The display unit displays the current location information about the vehicle on a road map.

According to the above-described vehicular navigation device, when the shape model of a curve is to be built based on location information about sampling points, an orientation difference involved in a movement on the entire curve maintains a constant value without being changed. Consequently, the shape model of the curve can be built with higher accuracy.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A curve modeling device executed on a processor comprising:
    a curvature calculation unit calculating a curvature at each of a plurality of sampling points positioned on a route based on location information of each of the plurality of sampling points;
    a curvature correction unit correcting the curvature at each of the plurality of sampling points and approximating the route by a straight line interval, an arc interval, or a smooth curve interval, wherein the curvature to be corrected is calculated by the curvature calculation unit; and a node information generation unit building a shape model of a curve included in the route by generating node information indicative of a location of a node on a road corresponding to the route based on the corrected curvatures of the plurality of sampling points, wherein the curvature correction unit corrects the curvature at each of the plurality of sampling points under a condition that an orientation difference defined by the curvatures calculated by the curvature calculation unit maintains a constant value.

2. The curve modeling device according to claim 1, wherein the route includes a plurality of sampling intervals defined by neighboring two of the plurality of sampling points, the curvature calculation unit calculates a curvature change amount of each of the plurality of sampling intervals based on the curvatures of the plurality of sampling points, the curvature correction unit includes:
    a maximum curvature extraction unit extracting a maximum curvature from the corrected curvatures at the respective sampling points;
    a maximum curvature change extraction unit extracting a maximum curvature change amount from the curvature change amounts of the plurality of sampling intervals, wherein the curvature change amounts being calculated by the curvature calculation unit; and
    a smooth curve interval adjustment unit determining a position of a smooth curve interval having a slope equivalent to the maximum curvature change amount under a condition that an orientation difference in a region maintains a constant value, wherein the region corresponds to the sampling interval from which the maximum curvature change amount is extracted with the sampling point having the maximum curvature as a boundary, and the maximum curvature is defined as a curvature of the arc interval.

3. The curve modeling device according to claim 1, wherein the curvature correction unit includes:
    a curvature adjustment unit equalizing the curvatures of the sampling points included in an equalization range, the equalization range being defined corresponding to each of the plurality of sampling points, wherein the curvature adjustment unit equalizes the curvatures of the sampling points in the equalization range under a condition that an orientation difference within the equalization range maintains a constant value, and the equalized curvature within the equalization range is defined as the corrected curvature; and
    a maximum curvature extraction unit extracting the maximum curvature from the corrected curvatures obtained by the curvature adjustment unit, and the maximum curvature is defined as a curvature of the arc interval.

4. The curve modeling device according to claim 3, wherein the route includes a plurality of sampling intervals defined by neighboring two of the plurality of sampling points, the curvature calculation unit calculates a curvature change amount of each of the plurality of sampling intervals based on the curvatures of the plurality of sampling points, and the curvature correction unit further includes:
    a maximum curvature extraction unit extracting a maximum curvature from the corrected curvatures at the respective sampling points; and
    a smooth curve interval adjustment unit determining a position of a smooth curve interval having a slope equivalent to the maximum curvature change amount under a condition that an orientation difference in a region maintains a constant value, wherein the region corresponds to the sampling interval from which the maximum curvature change amount is extracted with the sampling point having the maximum curvature as a boundary.

5. The curve modeling device according to claim 1, wherein the curvature correction unit includes a maximum curvature extraction unit extracting, from the corrected curvatures at the respective sampling points, an upward protruded peak having a curvature greater than both neighboring side curvatures and extracting a downward protruded peak having a curvature smaller than both neighboring side curvatures, when the downward protruded peak is determined to be smaller than the upward protruded peak under a predetermined criterion, the maximum curvature extraction unit extracts the downward protruded peak as a peak of the smooth curve and extracts the upward protruded peak as a maximum curvature, and an interval including the peak of the smooth curve is defined as a smooth curve interval having a curvature smaller than a predetermined value and an interval including the upward protruded peak is defined as the arc interval.

6. The curve modeling device according to claim 1, further comprising a curvature update unit receiving data related to the curvature calculated by the curvature calculation unit at each of the plurality of sampling points on the route, wherein, when the curvature update unit determines that previously received data indicating the curvature is stored in a storage unit, the curvature update unit updates the curvature at each of the plurality of sampling points based on a value of the curvature calculated by the curvature calculation unit and a value of the curvature stored in the storage unit, and the curvature correction unit corrects the value of the curvature updated by the curvature update unit at each of the plurality of sampling points on the route.

7. The curve modeling device according to claim 1, further comprising a location detection unit detecting the location information of each of the plurality of sampling points on the route, wherein the curvature calculation unit calculates the curvature at each of the plurality of sampling points based on the location information detected by the location detection unit at each of the plurality of sampling points.

8. The curve modeling device according to claim 1, further comprising a map data acquisition unit acquiring the location information of each of the plurality of sampling points on the route included in a map, wherein the curvature calculation unit calculates the curvature at each of the plurality of sampling points based on the location information acquired by the map data acquisition unit for each of the plurality of sampling points.

9. A vehicular navigation device comprising:

the curve modeling device according to claim 1;

a navigation unit calculating information of a route destined for a preselected destination based on current location information of a vehicle and road information stored in a storage unit; and a display unit displaying the current location information of the vehicle on a road map.

10. A curve modeling method executed on a curve modeling device by a processor comprising:

calculating a curvature at each of a plurality of sampling points positioned on a route based on location information of each of the plurality of sampling points;

correcting the curvature of each of the plurality of sampling points on the route;

approximating the route by a straight line interval, an arc interval, or a smooth curve interval under a condition that an orientation difference defined by the curvature at each of the plurality of sampling points maintains a constant value; and building a shape model of a curve included in the route by generating node information indicative of a location of a node on a road corresponding to the route based on the corrected curvatures.

* * * * *